(12) United States Patent
Liang

(10) Patent No.: US 6,507,500 B2
(45) Date of Patent: Jan. 14, 2003

(54) RING-FREE ZERO-VOLTAGE SWITCHING TECHNIQUE FOR USE IN SWITCHING POWER CONVERTERS

(75) Inventor: Jim H. Liang, Taipei (TW)

(73) Assignee: Skynet Electronic Co., Ltd., Taipei (TW)

( * ) Notice: Subject to any disclaimer, the term of this patent is extended or adjusted under 35 U.S.C. 154(b) by 29 days.

(21) Appl. No.: 09/836,419

(22) Filed: Apr. 18, 2001

(65) Prior Publication Data

US 2002/0126509 A1 Sep. 12, 2002

(30) Foreign Application Priority Data

Jan. 20, 2001 (TW) ........................ 90101389 A

(51) Int. Cl.[7] ........................... H02M 3/335; H02M 1/12
(52) U.S. Cl. ....................... 363/16; 363/40; 363/97; 363/131
(58) Field of Search .................. 363/16, 17, 20–21.18, 363/24, 25, 39, 40, 95, 97, 131, 132

(56) References Cited

U.S. PATENT DOCUMENTS 5,418,704 A * 5/1995 Hua et al. ............... 323/282
5,959,438 A * 1/1998 Jovanovic et al. ........ 363/25 X
6,147,886 A * 11/2000 Wittenbreder ............ 363/95

* cited by examiner

Primary Examiner—Jessica Han
(74) Attorney, Agent, or Firm—Bacon & Thomas, PLLC

(57) ABSTRACT

A ring-free zero-voltage switching technique for use in a switching power converter having a zero-voltage switching circuit to achieve high-performance and high-density zero-voltage switching and a transformer to produce an oscillatory L-C circuit at the primary side thereof during zero-voltage switching of the switching power converter, the technique includes the step of short-circuiting the current at inductance means of the L-C circuit upon the occurrence of ringing, and to suppress the voltage at capacitor means of the L-C circuit, so as to eliminate parasitic ringing produced by the zero-voltage switching circuit, to effectively reduce power loss and lower the reverse voltage rating requirement to the secondary side rectification component, to greatly increase the working frequency and power density, to eliminate EMI noises, to minimize the size of the heat sink required for dissipating heat energy from the power MOSFETS, and to let the switching power converters meet the requirements of international EMI regulations and be applicable to the designs of mini electronic products.

23 Claims, 26 Drawing Sheets

RING-FREE ZERO-VOLTAGE SWITCHING TECHNIQUE FOR USE IN SWITCHING POWER CONVERTERS

BACKGROUND OF THE INVENTION

1. Field of the Invention

The present invention relates to a ring-free zero-voltage switching technique for use in switching power converters and, more particularly to such a ring-free zero-voltage switching technique, which greatly reduces magnetic loss and switching loss during high-performance high-density switching process of the switching power converter.

2. Description of the Prior Art

In recent years, in order to follow the tendency of making electronic products smaller, the development of switching power converter technology is aimed at high frequency, high performance, and high density. Normally, the switching speed of power MOSFET is much faster than bipolar transistor. Therefore, power MOSFET is intensively used in switching power converter for use as a power switch. However, the energy accumulated in parasitic capacitance of power MOSFET will be used up by means of ohmic heating in the passage each time power MOSFET is electrically connected. The higher the switching frequency is the greater the loss will be. If this problem is not eliminated, power-switching converter cannot achieve high performance and high density switching operation.

Since the report of zero-voltage switching issued by C. P. Henze, H. C. Martin and D. W. Paraley on IEEE in 1988, several practical circuits have been disclosed to effectively eliminate connection loss of conventional power MOSFET. Exemplars of these prior techniques are outlined hereinafter:

(1) Forward Zero-Voltage Switching Power Converter:

The circuit shown in FIG. 1(A) is the embodiment of U.S. Pat. No. 383,594 designed by Bruce Wilkinson and filed in June 1989. This patent enables transformer to work in between positive and negative magnetic zones by means of controlling the circuit, therefore under same output power, relatively smaller transformer can be used. By means of this circuit design, Putrice R. Lethellier invented a first practical zero-voltage switching circuit. This circuit architecture, as shown in FIG. 1(b), is granted a U.S. Pat. No. 4,975,821 in October 1990. In order to achieve zero-voltage switching, transformer adopts loose cross-linking, and gap is provided in its magnetic core, so as to obtain the requisite magnetizing inductance and leakage inductance, for enabling magnetizing inductance and leakage inductance to form a L-C resonance circuit with parasitic capacitance $C_s$ being connected in parallel to switch $SW_1$, which enables switch $SW_1$ to obtain zero-voltage switching condition at the moment $SW_2$ is switched off. Similarly, the resonance of L-C resonance circuit enables switch $SW_2$ to obtain zero-voltage switching condition at the moment $SW_1$ is switched off, however since the existence of gap and leakage inductance in magnetic core of transformer would cause a significant magnetic loss, which resulting in abnormal production of heat and lowering of performance of transformer when the circuit achieving the zero-voltage switching condition.

FIGS. 2(a) and 2(b) show the circuits of U.S. Pat. No. 5,245,520 issued in September 1993, filed in October 1991 by Paul Imbertson. Circuit of FIG. 2(a) can be called as "Half bridge asymmetrical buck converter". Circuit of FIG. 2(b) can be called as "Full bridge asymmetrical buck converter". Because these two circuits have been added with an auxiliary inductor La equivalent to transformer leakage inductance, the transformer eliminates the problem of abnormal heating when achieving zero-voltage switching. However, auxiliary inductor La and the stray capacitance at two ends of the primary winding of the transformer would produce a significant ringing. Because the ringing current oscillates between the inductor and the winding of the transformer, it produces induction heating to the magnetic core, and lowers down the performances thereof. Further, because the parasitic oscillation increases EMI noises to the secondary winding of the transformer, the reverse voltage rating of the secondary rectifier elements must be increased by at least 1.5 times. These are the drawbacks induced by the ringing on the windings of the transformer of Imbertson's circuit. FIG. 3 shows the ringing on the primary winding and the secondary winding of the transformer of Imbertson's circuit.

(2) Flyback Zero-Voltage Switching Power Converter:

FIGS. 4(a) and 4(b) show the circuits of U.S. Pat. No. 5,057,986 issued in October 1991 to Christopher P. Henze and Hubert C. Martin Jr. This disclosure eliminates the use of an auxiliary inductor La. In order to achieve zero-voltage switching, the gap of the transformer must be greatly increased, to let the peak-to-peak value of the primary magnetizing current of the transformer be greater than the load current to the primary side reflected by the secondary side. Similar to Putrice R. Lethellier's patented invention, this design causes abnormal heating of the transformer. In order to eliminate abnormal heating, the size of the transformer must be greatly increased so as to improve the capability of dissipating heat of the transformer.

FIGS. 5(a) and 5(b) show the circuits of U.S. Pat. No. 5,402,329 issued in March 1995 to Wittenbreder, Jr. and Ernest H. Because these circuits use an auxiliary inductor, they can easily achieve zero-voltage switching without making the peak-to-peak value of the primary magnetizing current of the transformer to be greater than the load current reflected to the primary side by the secondary side. The auxiliary inductor can be a leakage inductance during cross-linking winding of the transformer, or an added inductor. No matter the auxiliary inductor exists in what kinds of type, this patent can not eliminate the problem of the side effect caused by ringing as encountered in Imbertson's patent. FIG. 6 shows the ringing on the primary winding and the secondary winding of the transformer of the circuits designed by Wittenbreder, Jr. and Ernest H.

SUMMARY OF THE INVENTION

The present invention has been accomplished to provide a ring-free zero-voltage switching technique for use in switching power converters, which eliminates the occurrence of induction heating effect to the magnetic core caused by parasitic ringing during zero-voltage switching of power rectifier switches, preventing reverse voltage impact to rectifier components and eliminating EMI noises.

According to one embodiment of the present invention, the zero-voltage switching circuit with auxiliary inductor and balance capacitor of a conventional switching power converter is re-arranged, and at least one inductor current shorted diode is added to the zero-voltage switching circuit to suppress parasitic oscillation formed by the stray capacitance at the primary side of main transformer of the switching power converter, so as to prevent the auxiliary inductor and the main transformer from producing EMI noise, to effectively lower the reverse voltage rating requirement of secondary side rectification component, to greatly increase the working frequency and power density, and to let the switching power converter meet the requirements of international EMI regulations.

According to another embodiment of the present invention, the auxiliary inductance of the zero-voltage switching circuit is installed in the series circuit between the transformer and two power MOSFETs, and at least one diode is added to the circuit connection between the primary winding of the transformer and the added inductor, so that the diode works with the corresponding power MOSFET to short-circuit the electric current of the auxiliary inductor and to suppress the voltage of the stray capacitor at the primary side of the transformer upon the occurrence of ringing of the added inductor, preventing the stray capacitor from oscillation, so as to achieve high-performance high-density low-noise zero-voltage switching operation.

Furthermore, the ring-free switching technique of the present invention can be used in flyback, boost-forward, and boost-flyback switching power converters to prevent the occurrence of ringing, so as to effectively reduce power loss and lower the reverse voltage rating requirement of secondary side rectification component, to greatly increase the working frequency and power density, to eliminate EMI noises, to minimize the size of the heat sink required for dissipating heat energy from the power MOSFETS, and to let the switching power converters be applicable to the designs of mini electronic products.

BRIEF DESCRIPTION OF THE DRAWINGS

FIGS. 10-1(a)–10-5(b) illustrate the circuit diagrams of the ten equivalent circuits of FIG. 7.

DETAILED DESCRIPTION OF THE PREFERRED EMBODIMENT

The invention pertains to ring-free zero-voltage switching technique for use in switching power converters. The technique is designed to short-circuit the electric current of the inductance of a L-C resonance circuit, which is produced at the primary side of a transformer of a switching power converter during high-performance high-density zero-voltage switching, to suppress the voltage of the capacitance of the L-C resonance circuit at the beginning of the occurrence of ringing, so as to effectively eliminate parasitic ringing from the zero-voltage switching circuit.

The invention re-arranges the zero-voltage switching circuits having auxiliary inductor and balance capacitor of conventional switching power converter. The present invention is to connect an auxiliary inductor to the series connection between the primary winding of the transformer and two power MOSFETs and a shorted diode or two shorted diodes to the connecting point between the primary winding of the transformer and the added auxiliary inductor. When the L-C circuit formed of the added auxiliary inductor and the stray capacitance of the primary side of the transformer starts ringing, the shorted diodes act on the corresponding power MOSFETs to short-circuit the electric current of the added auxiliary inductor and to suppress the voltage of the stray capacitance at the primary side of the transformer, so as to prohibit the stray capacitance from oscillation and to effectively eliminate the occurrence of ringing, enabling the switching power converter to achieve high-performance high-density low-noise zero-voltage switching operation.

Figure 7:
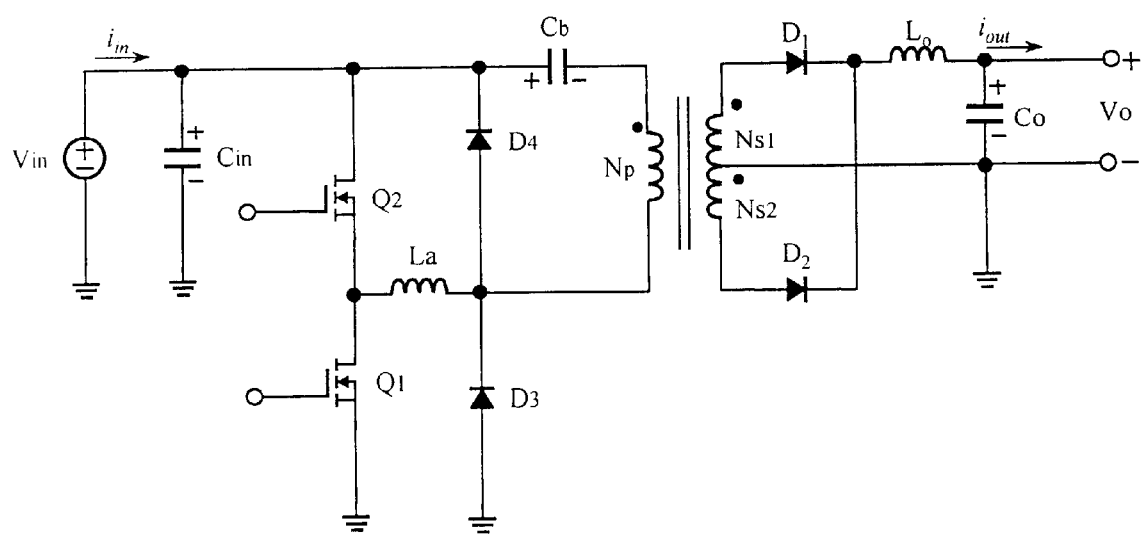
FIG. 7 is a circuit diagram of the first embodiment of the present invention.

FIG. 7 shows a first embodiment of the present invention, in which the ring-free zero-voltage switching technique is used in a half bridge forward zero-voltage-switching full-wave converter. The circuit of this embodiment is herein called as half-bridge forward ring-free zero-voltage-switching full-wave converter. According to this embodiment, the half-bridge forward ring-free zero-voltage-switching full-wave converter comprises an input voltage filter capacitor Cin, and a series of power MOSFETs Q1;Q2 connected in parallel to the input voltage filter capacitor Cin. The positive and negative poles of the input voltage filter capacitor Cin are bridged to the positive and negative poles of an input voltage Vin. The second power MOSFET Q2 has its drain connected to the positive pole of the input voltage filter capacitor Cin, and its source connected to the drain of the first power MOSFET Q1. The source of the first power MOSFET Q1 is connected to the negative pole of the input voltage filter capacitor Cin. Therefore, the input voltage filter capacitor Cin provides a stable input voltage to the transformer. The transformer is adapted to store and release electric energy, comprising a primary winding Np and two secondary windings Ns1;Ns2. The inductance volumes of the windings Np;Ns1;Ns2 are Lp;Ls1;Ls2 respectively. The primary winding Np has one end connected to the negative pole of a balance capacitor Cb, and the other end connected to the circuit between the power MOSFETs Q1;Q2 through an auxiliary inductance La. The positive pole of the balance capacitor Cb is connected to the drain of the second power MOSFET Q2. According to this embodiment, the circuit between the primary winding Np and the auxiliary inductance La is respectively connected to the drain of the second power MOSFET Q2 and the source of the first power MOSFET Q1 through diodes D4 and D3 respectively, so that the diode D4 (or D3) works with the power MOSFET Q2 (or Q1) to let the electric current $i_{La}$ of the auxiliary inductance La be short-circuited by the power MOSFET Q2 and the diode D4 (by the power MOSFET Q1 and the diode D3) to terminate the ringing upon its formation. The secondary windings Ns1;Ns2 each have one end connected to the negative pole of an output voltage filter capacitor Co, and the other end respectively connected to the positive pole of the diodes D1;D2. The negative pole of the diodes D1;D2 is respectively connected to the positive pole of the output voltage filter capacitor Co through an inductance Lo, so that the output voltage filter capacitor Co provides a stable DC output voltage Vo to the load at the output end.

Figure 8:
FIG. 8 illustrates the occurrence of parasitic ringing of the circuit of FIG. 7 without ring suppressing circuit.
Figure 9A:
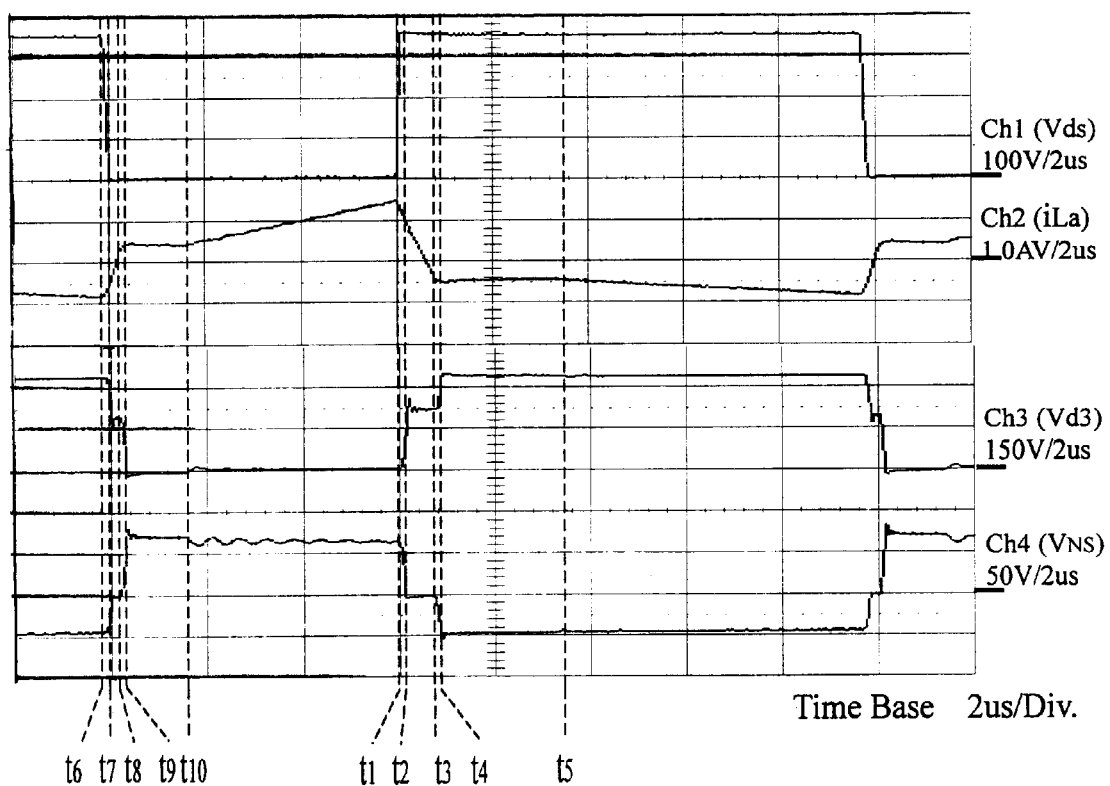
FIGS. 9(a) and 9(b) are waveform chart obtained from the circuit of FIG. 7 with ring suppressing circuit added, showing parasitic ringing disappeared.
Figure 9B:
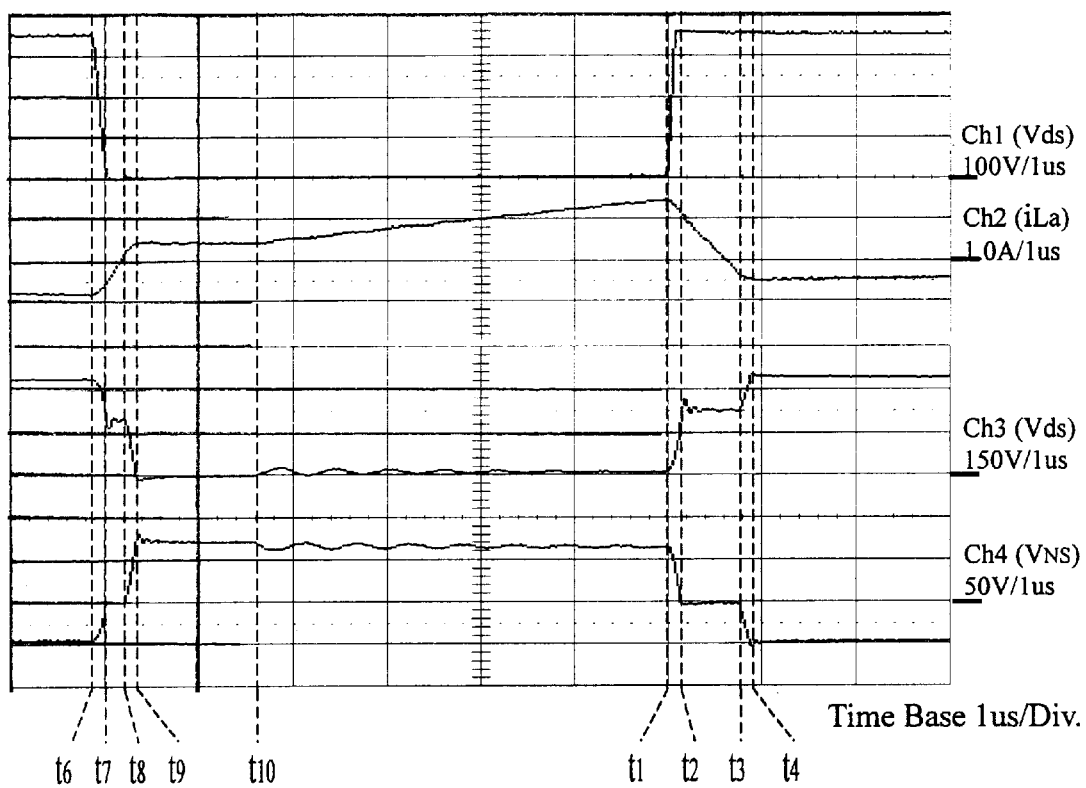

In order to see the effect of the ringing, the two diodes D3 and D4 for short-circuiting the inductor La are removed, and then a oscilloscope is used to measure the waveforms of the voltage and the current after the working of the circuit has become stable. The measured waveforms are shown in FIG. 8. As illustrated in FIG. 8, the ringing occurred after the time t3 and t8. FIG. 9 shows the waveforms measured after installation of the diodes D3 and D4. As illustrated in FIG. 9, the ringing occurred at the initial stage after the time t3 and t8, however the ringing is suppressed when reached the time t4 and t9, and insignificant ringing occurred again after the time t5 and t10. As indicated above, the invention uses two diodes to short-circuit the electric current of the L-C circuit, to further suppress the voltage of the capacitance and prohibit its oscillation, so as to effectively eliminate the occurrence of ringing.

Figures 1A, 10:
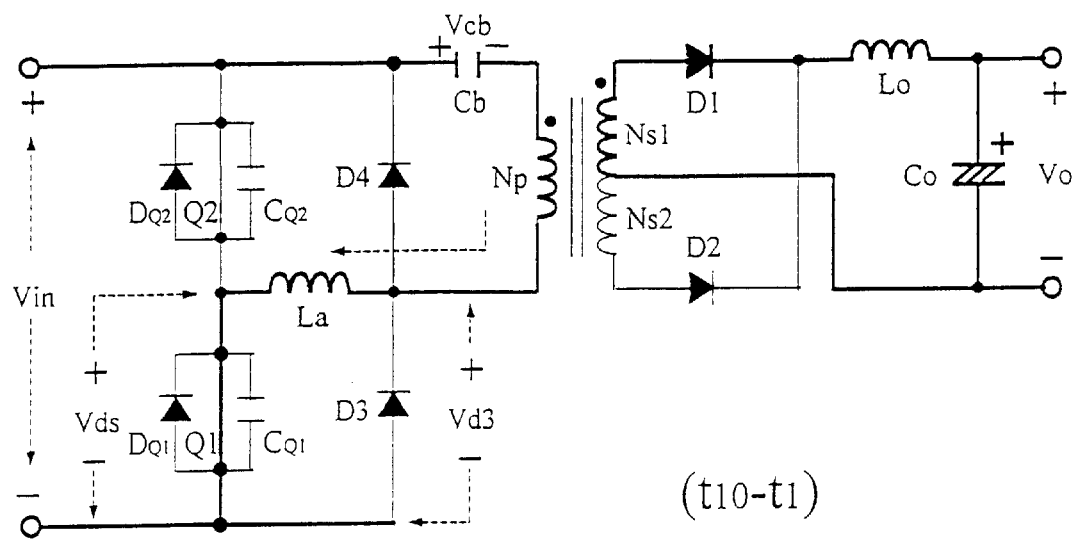
Figures 1B, 10:
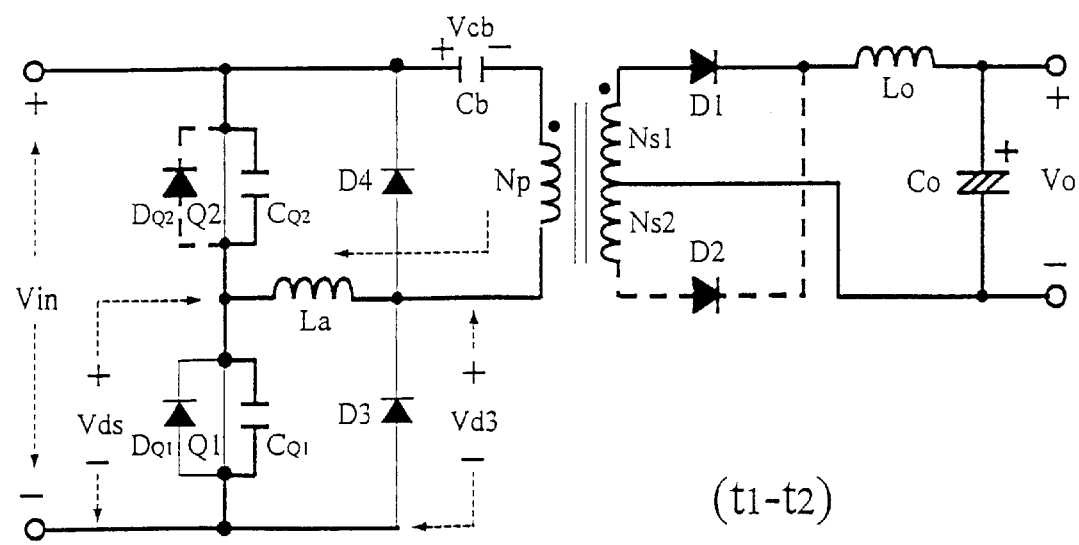
Figures 2A, 10:
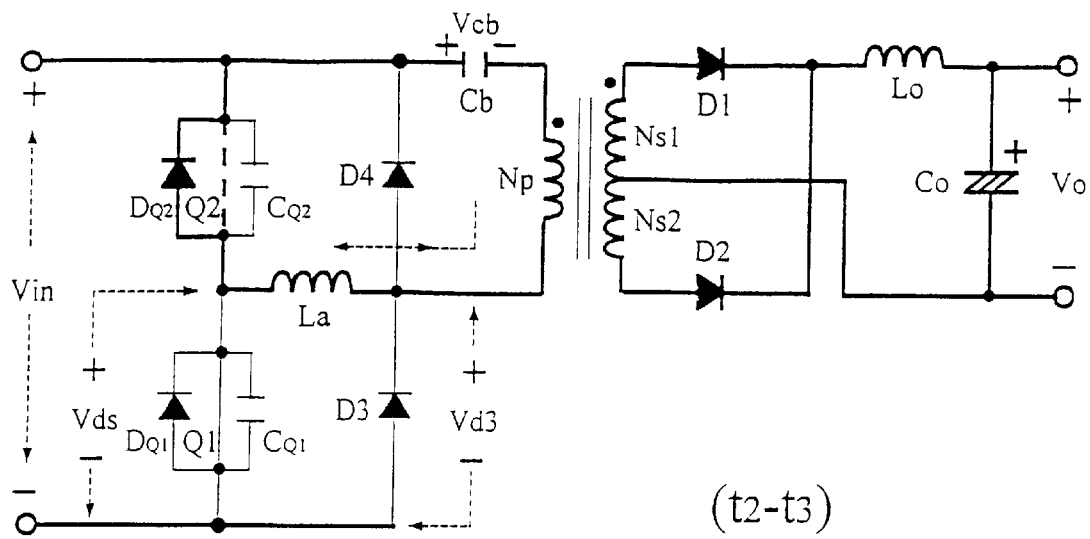
Figures 2B, 10:
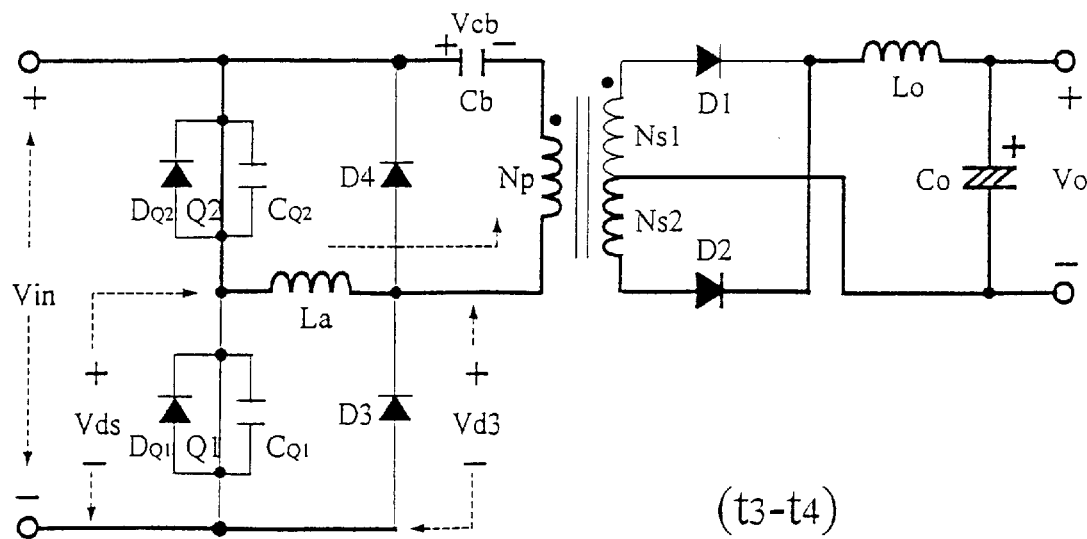
Figures 3A, 10:
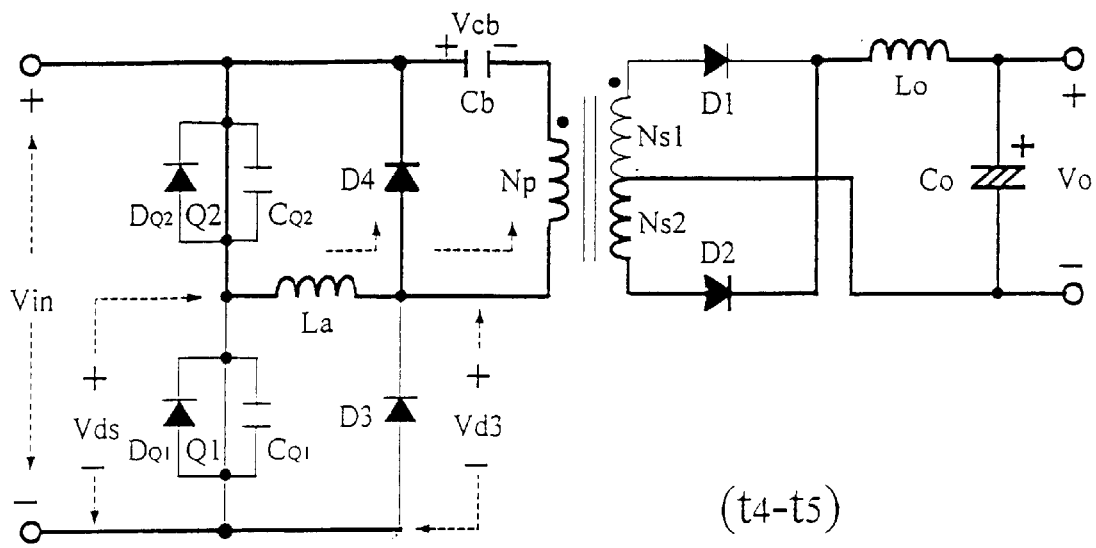
Figures 3B, 10:
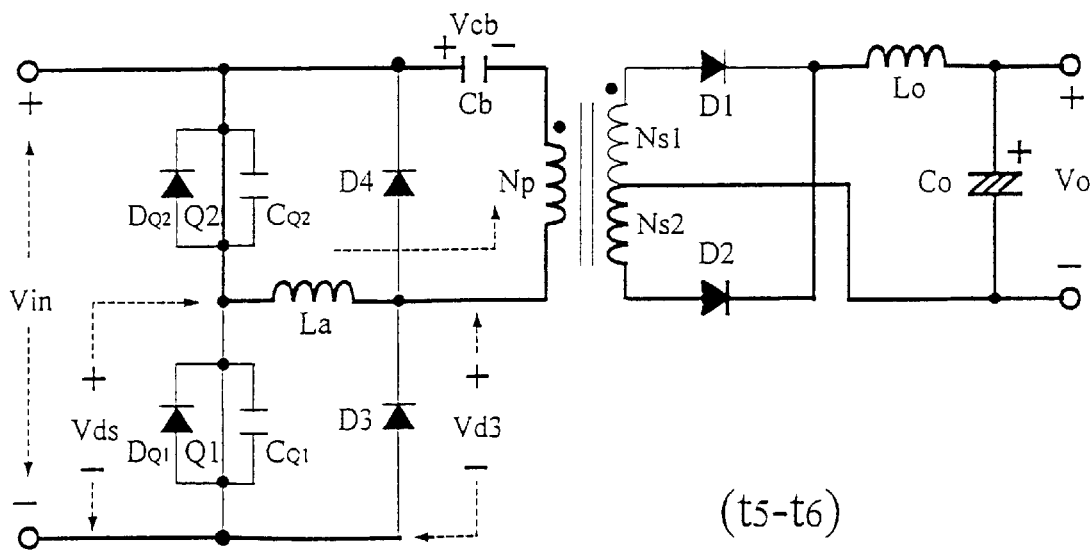
Figures 4A, 10:
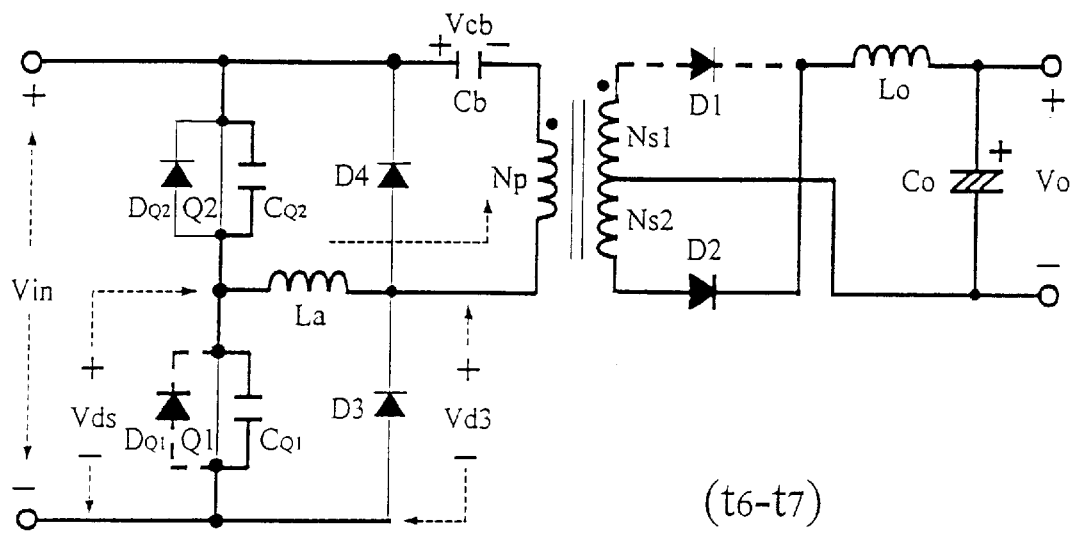
Figures 4B, 10:
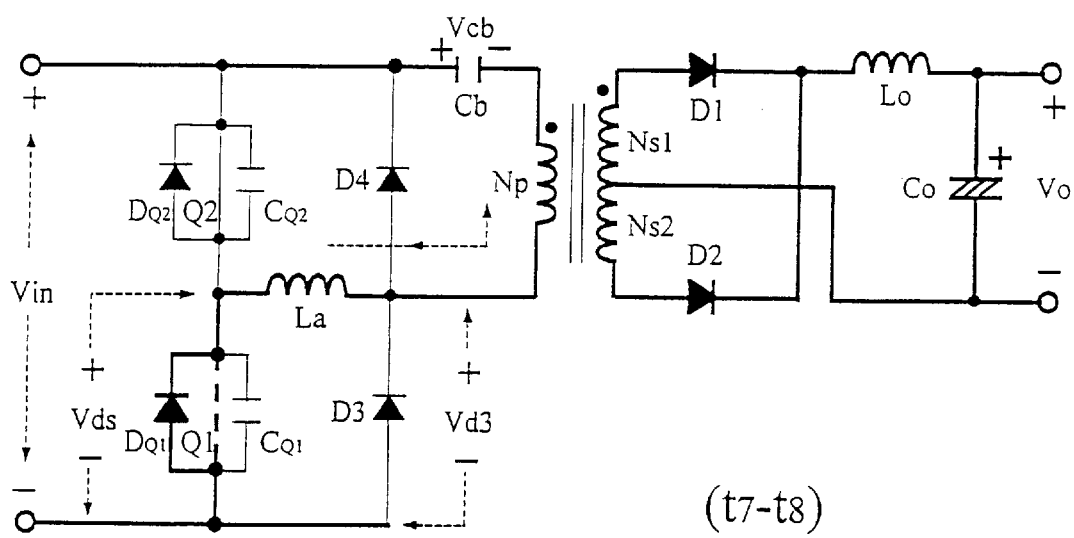
Figures 5A, 10:
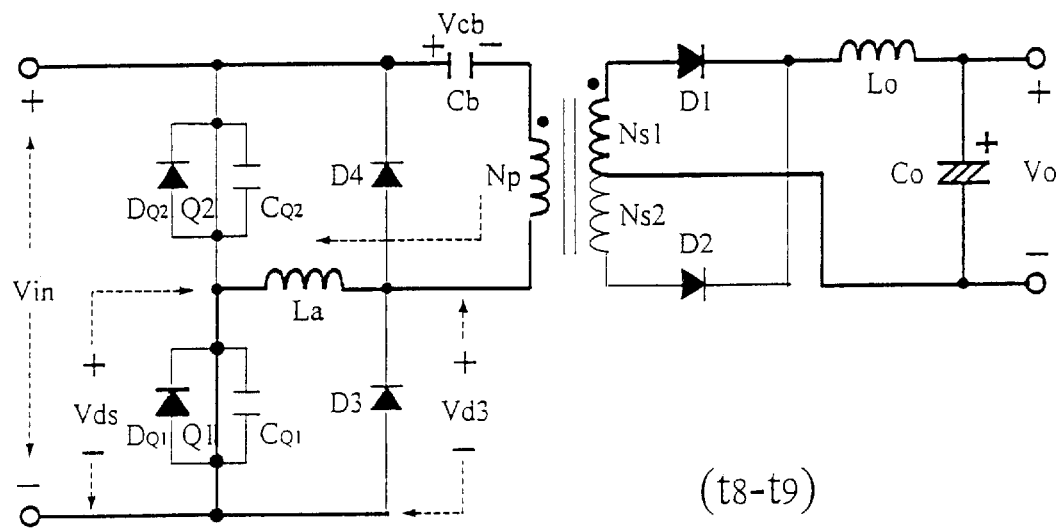
Figures 5B, 10:
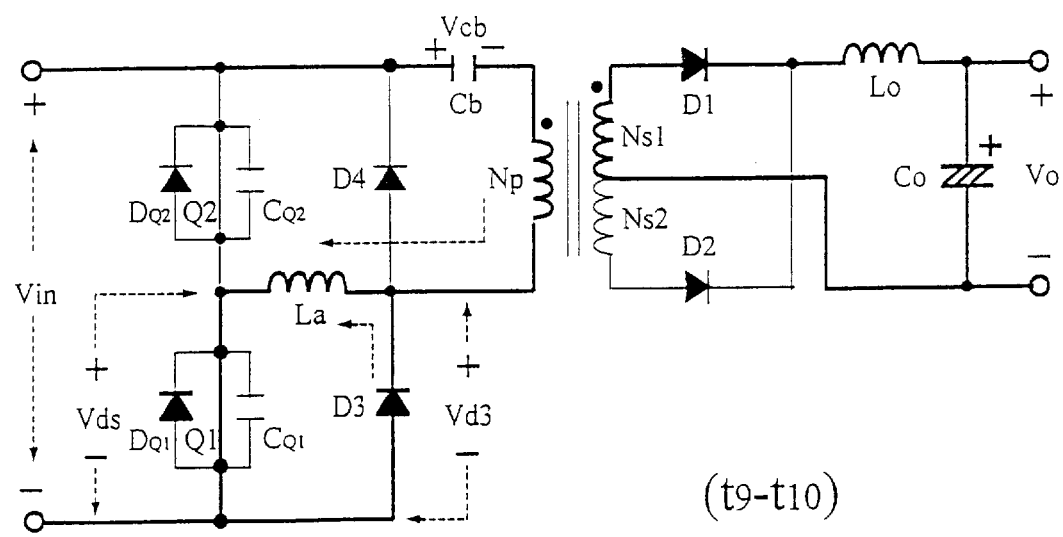

In order to explain the respective interaction between the power MOSFETS Q1 and Q2 and the diodes D3 and D4 to suppress the occurrence of ringing when the power MOSFETS Q1 and Q2 being electrically connected respectively, the waveforms of FIG. 9(*a*) are enlarged and divided into 10 time segments, and the related equivalent circuits are shown in FIGS. 10. In the equivalent circuits shown in FIG. 10, the thick real line represents the circuit under working, the thin real line represents the circuit that does no work, and the imaginary line represents the status of circuit variation when switched at zero-voltage. The circuit actions of the respective time segments are explained hereinafter:

(1) t10~t1 Time Segment:

Referring to the equivalent circuit shown in FIG. 10-1(*a*), this time segment and the last time segment are within the energy delivery stage. Within this time segment, the power MOSFET Q1 and the diode D1 are electrically connected, electric current enters the non-inverter terminal of the power input end Vin, and then passes through the balance capacitor Cb, the primary winding Np, the auxiliary inductance La and the power MOSFET Q1, and then flows back to the inverter terminal of power input end Vin. At this time segment, the balance capacitor Cb and the auxiliary inductance La at the primary side are electrically charged, the inductance Lo and capacitor Co are electrically charged too.

Figure 1A:
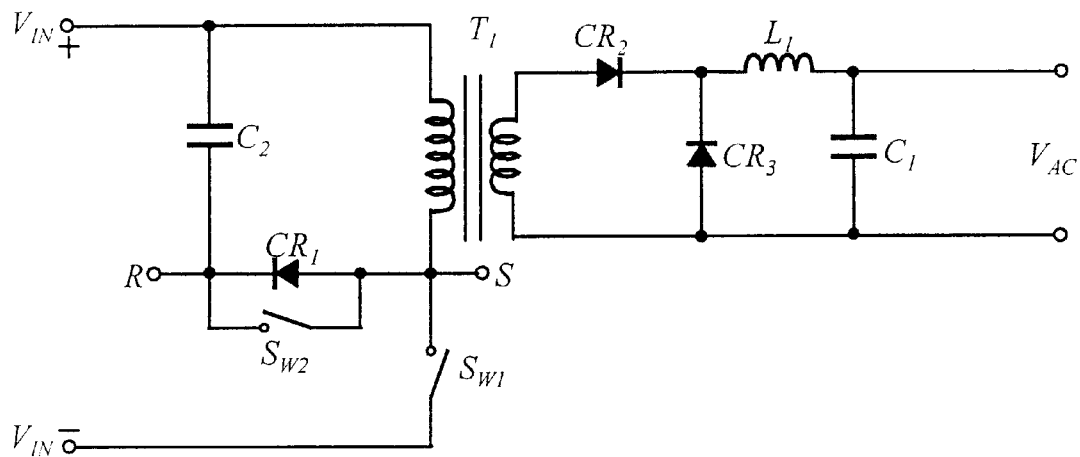
FIG. 1(a) is a circuit diagram of the design of U.S. Pat. No. 383,594.
Figure 1B:
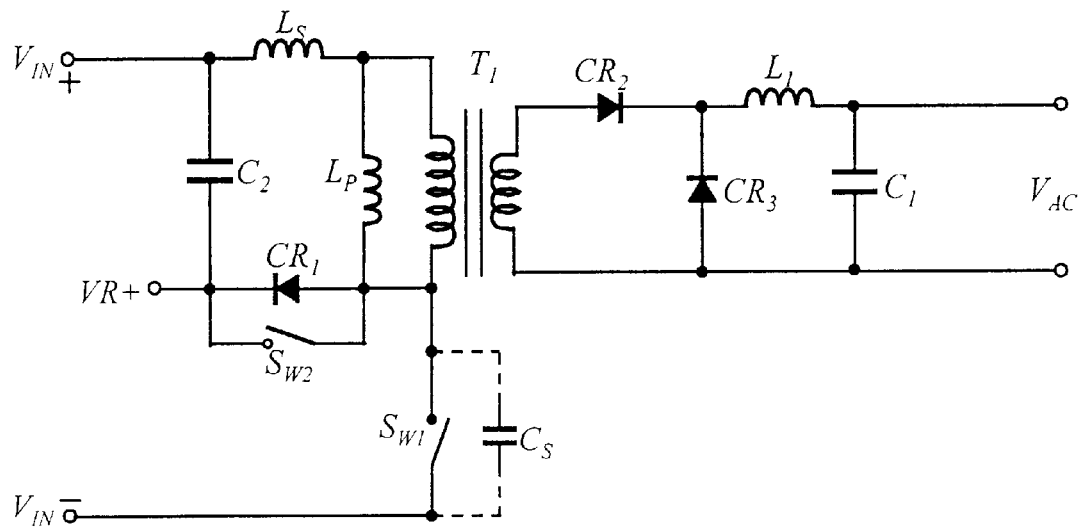
FIG. 1(b) is a circuit diagram of the design of U.S. Pat. No. 4,975,821
Figure 2A:
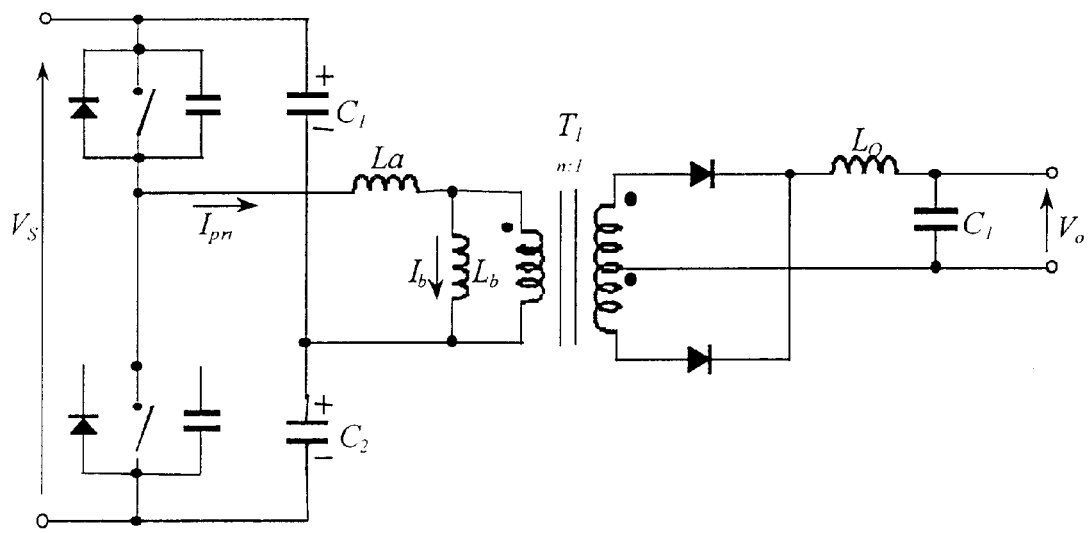
FIGS. 2(a) and 2(b) are circuit diagrams of the designs of U.S. Pat. No. 5,245,520.
Figure 2B:
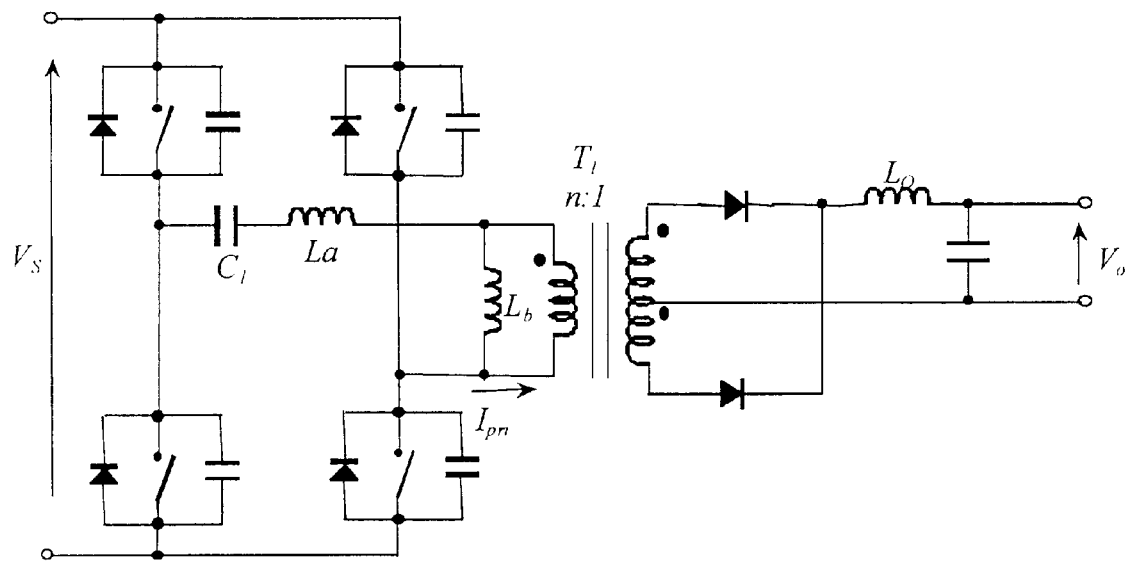

(2) t1~t2 Time Segment:

Referring to the equivalent circuit shown in FIG. 10-1(b), this time segment is the resonance stage for enabling the power MOSFET Q2 to be zero-voltage switched. When at the time t1, the power MOSFET Q1 is open-circuited. A L-C tank is formed by the auxiliary inductance La, the equivalent inductance $L_{NP}$ at the primary side of the transformer and the parasitic capacitors $C_{Q1}$; $C_{Q2}$ of the power MOSFETs Q1; Q2, which uses the electric current $i_{La}$ of the auxiliary inductance La at the time t1 as the initial current of resonance to charge the parasitic capacitors $C_{Q1}$ and $C_{Q2}$ respectively. This resonance enables the power MOSFET Q2 to be zero-voltage switched. When the voltage at the primary winding Np is reduced to zero, the diode D2 is electrically connected to work with the electrically connected diode D1 and to short-circuit the secondary winding of the transformer. Then, by means of the assistance of the auxiliary inductance La, the parasitic capacitors $C_{Q1}$ and $C_{Q2}$ are charged continuously. The parasitic diode $D_{Q2}$ is electrically connected when the voltage Vds at the capacitor $C_{Q1}$ surpassed Vin, forming the opportunity for enabling the power MOSFET Q2 to be zero-voltage switched.

(3) t2~t3 Time Segment:

Referring to the equivalent circuit shown in FIG. 10-2(*a*), this time segment is the direction change stage of the electric current $i_{La}$ at the auxiliary inductance La. Within this time segment, the diodes D1 and D2 are electrically connected, therefore the primary winding Np has no voltage. Because the parasitic diode $D_{Q2}$ and the power MOSFET Q2 are electrically connected, the voltage at the auxiliary inductance La is equal to the voltage Vcb at the capacitor Cb, the slope of the electric current $i_{La}$ is −Vcb/La. When the electric current $i_{La}$ is at positive value, it means the capacitor Cb is under charging. When the electric current $i_{La}$ is changed to negative value, it means the capacitor Cb starts to discharge.

(4) t3~t4 Time Segment:

Referring to the equivalent circuit shown in FIG. 10-2(*b*), this time segment is the ringing in upper side stage. At the time t3, the capacitor Cb is discharged, the voltage at the primary winding Np is changed from zero to negative value, causing the diode D1 to be reversed and stopped, and therefore the auxiliary inductance La forms a tank with the stray capacitor $C_{NP}$ at the primary side of the transformer. At this time segment, the stray capacitor $C_{NP}$ will be charged and discharged, causing a ringing in case the diode D4 does not exist.

Figure 3:
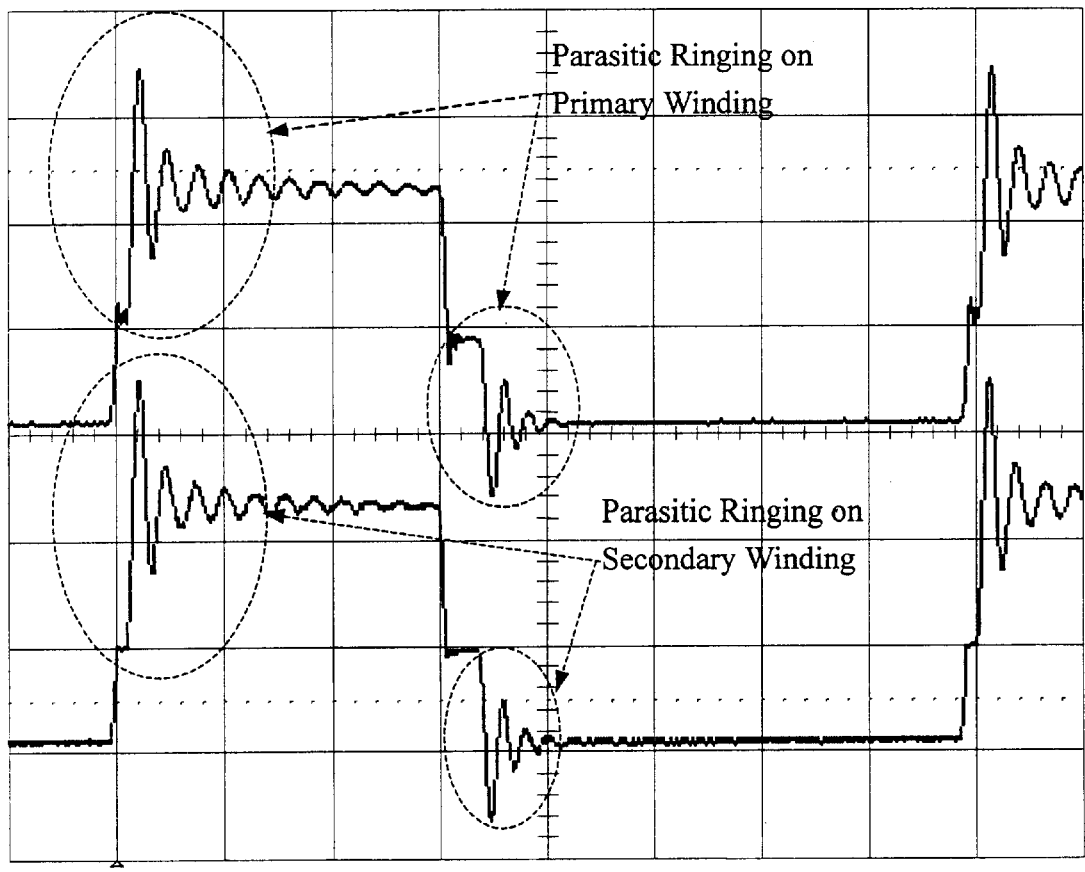
FIG. 3 illustrates the occurrence of parasitic ringing on primary winding and secondary winding of Imbertson's patented circuit.

(5) t4~t5 Time Segment:

Referring to the equivalent circuit shown in FIG. 10-3(*a*), this time segment is the ringing in upper side short circuit stage. When the diode D2 is stopped within this time segment, the voltage Vd3 boosts rapidly. As soon as the voltage Vd3 surpasses the input voltage Vin (at the time t4), the diode D4 is electrically connected, the electric current at the auxiliary inductance La is short-circuited by the power MOSFET Q2 and the diode D4, and therefore the ringing is terminated to achieve the objective of ring free in upper side. When at the time t5, the electric current at the diode D4 is insufficient to turn on the diode D4, the energy at the auxiliary inductance La can only produce insignificant ringing without affecting the normal operation of the circuit.

(6) t5~t6 Time Segment:

Referring to the equivalent circuit shown in FIG. 10-3(*b*), this time segment and the last time segment are within the energy delivery stage. Within this time segment, the power MOSFET Q2 and the diode D2 are electrically connected, electric current flows out of the positive terminal of the capacitor Cb through the power MOSFET Q2, the auxiliary inductance La and the primary winding Np to the negative terminal of the capacitor Cb. At this time segment, the energy of the capacitor Cb is cross-linked to the circuit at the secondary side of the transformer to charge the inductance Lo and the capacitor Co via the diode D2.

Figure 4A:
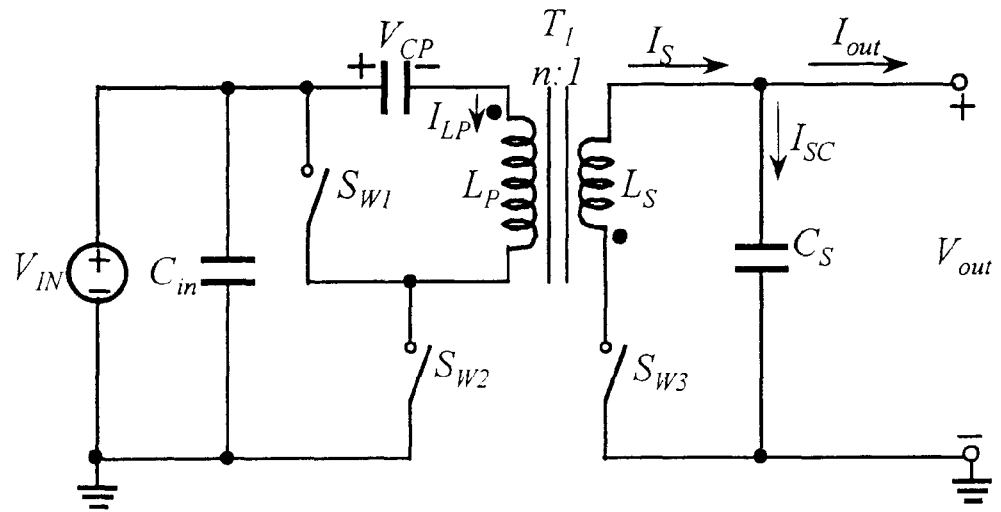
FIGS. 4(a) and 4(b) are circuit diagrams of the designs of U.S. Pat. No. 5,057,986.

(7) t6~t7 Time Segment:

Referring to the equivalent circuit shown in FIG. 10-4(a), this time segment is the resonance stage forming the opportunity of enabling the power MOSFET Q1 to be zero-voltage switched. When at the time t6, the power MOSFET Q2 is open-circuited, a L-C tank is formed by the auxiliary inductance La, the equivalent inductance $L_{NP}$ at the primary winding of the transformer and the parasitic capacitors $C_{Q1}$; $C_{Q2}$, which uses the electric current $i_{La}$ of the auxiliary inductance La at the time t6 as the initial current of resonance to charge the parasitic capacitors $C_{Q1}$ and $C_{Q2}$ respectively. This resonance enables the power MOSFET Q1 to be zero-voltage switched. When the voltage at the primary winding Np is reduced to zero, the diode D1 is electrically connected to work with the electrically connected diode D2 and to short-circuit the secondary winding of the transformer. Then, by means of the assistance of the auxiliary inductance La, the parasitic capacitors $C_{Q1}$ and $C_{Q2}$ are discharged continuously. The parasitic diode $D_{Q1}$ is electrically connected when the voltage Vds at the capacitor $C_{Q1}$ drops below zero voltage, forming the opportunity for enabling the power MOSFET Q1 to be zero-voltage switched.

Figure 4B:
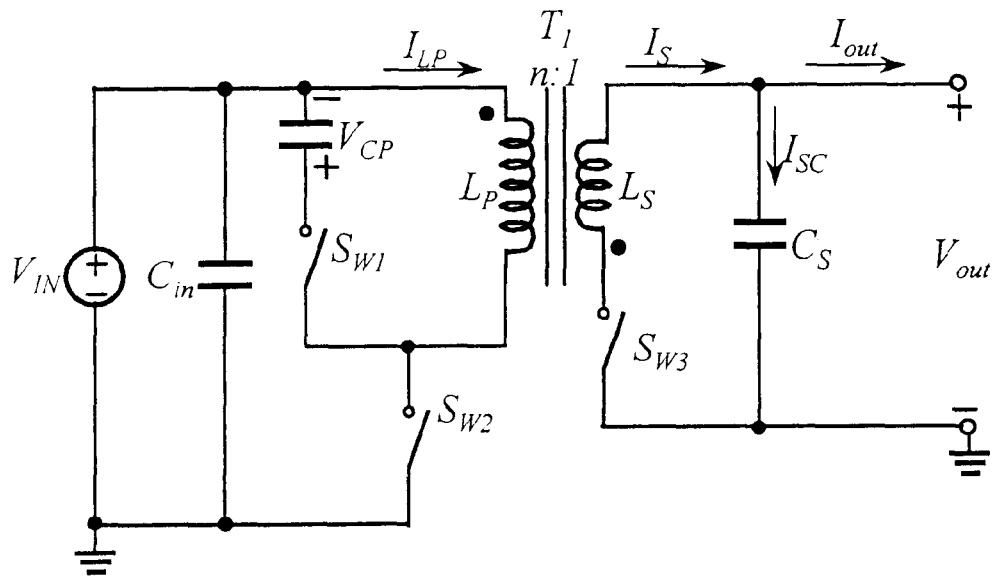

(8) t7~t8 Time Segment:

Referring to the equivalent circuit shown in FIG. 10-4(b), this time segment is the direction change stage of the electric current $i_{La}$ at the auxiliary inductance La. Within this time segment, the diodes D1 and D2 are electrically connected, therefore the primary winding Np has no voltage. Because the parasitic diode $D_{Q1}$ and the power MOSFET Q1 are electrically connected, the voltage at the auxiliary inductance La is equal to the voltage difference Vin−Vcb between the input voltage Vin and the voltage Vcb at the capacitor Cb, the slope of the electric current $i_{La}$ is Vin−Vcb/La. When the electric current $i_{La}$ is at negative value, it means the capacitor Cb is under discharging. When the electric current $i_{La}$ is changed to positive value, it means the capacitor Cb becomes charged.

Figure 5A:
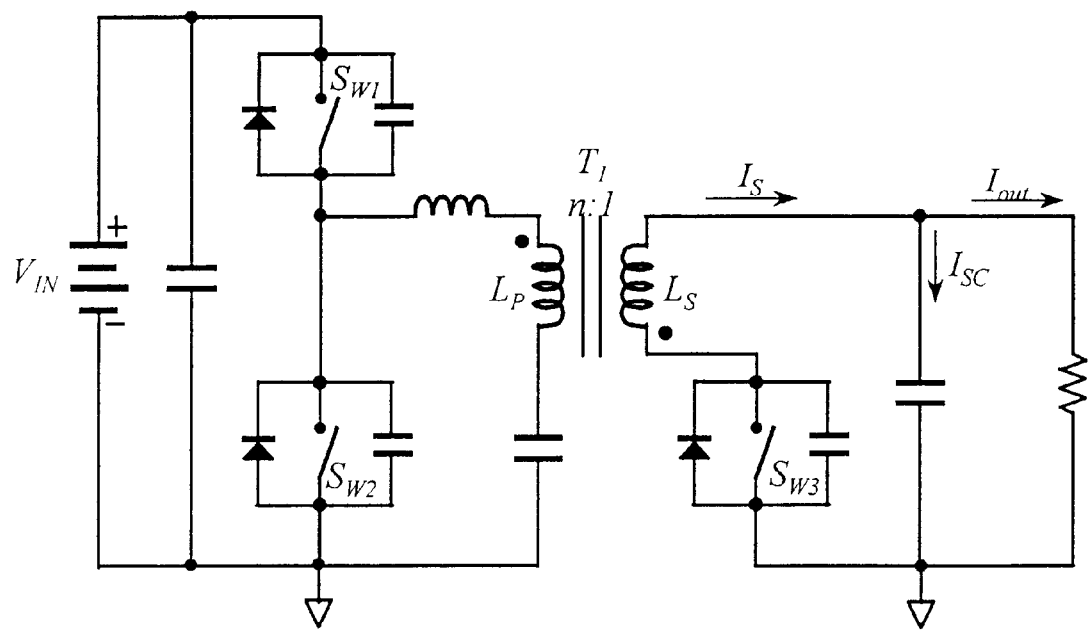
FIGS. 5(a) and 5(b) are circuit diagrams of the designs of U.S. Pat. No. 5,402,329.

(9) t8~t9 Time Segment:

Referring to the equivalent circuit shown in FIG. 10-5(a), this time segment is the ringing in lower side stage. At the time t8, the capacitor Cb is charged, the voltage at the primary winding Np is changed from zero to positive value, causing the diode D2 to be reversed and stopped, and therefore the auxiliary inductance La forms a tank with the stray capacitor $C_{NP}$ at the primary side of the transformer. At this time segment, the stray capacitor $C_{NP}$ will be charged and discharged, causing a ringing in case the diode D3 does not exist.

Figure 5B:
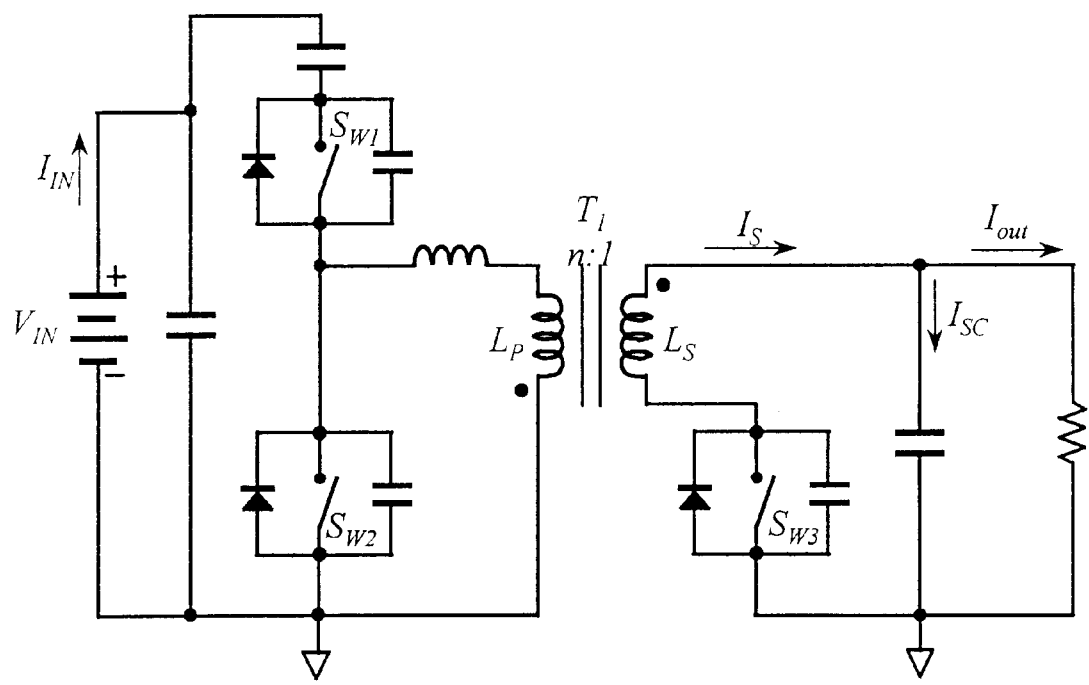
Figure 6:
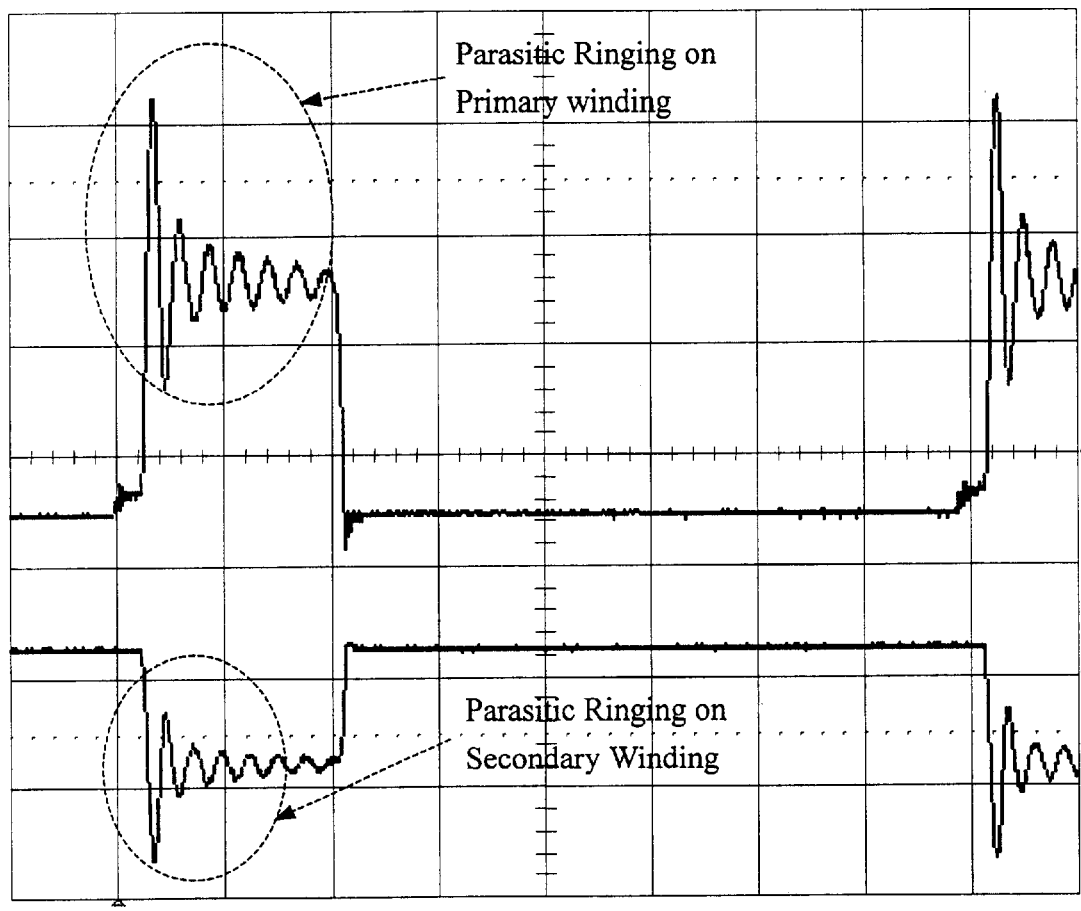
FIG. 6 illustrates the occurrence of parasitic ringing on primary winding and secondary winding of the patented circuit of Wittenbreder, Jr. and Ernest H.

(10) t9~t10 Time Segment:

Referring to the equivalent circuit shown in FIG. 10-5(b), this time segment is the ringing in lower side short circuit stage. When the diode D2 is stopped within this time segment, the voltage Vd3 drops rapidly. As soon as the voltage Vd3 drops below zero voltage (at the time t9), the diode D3 is electrically connected, the electric current at the auxiliary inductance La is short-circuited by the power MOSFET Q1 and the diode D3, and therefore the ringing is terminated to achieve the objective of ring free in lower side. When at the time t10, the electric current at the diode D3 is insufficient to turn on the diode D3, the energy at the auxiliary inductance La can only produce insignificant ringing without affecting the normal operation of the circuit.

As stated above, the ring current in upper side is short-circuited during the time segments t4~t5, and the ring current in lower side is short-circuited during the time segments t9~t10. Thus, this embodiment smoothly performs ring free zero-voltage switching action.

Figure 11A:
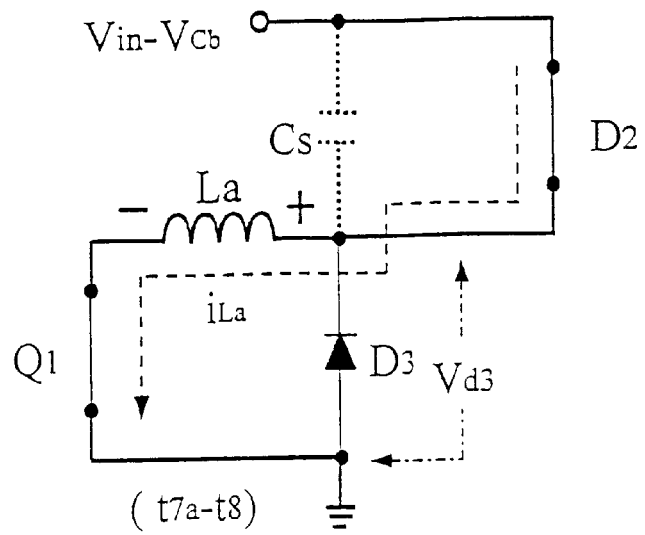
FIGS. 11(a)–11(c) illustrate time segment charts of the ringing on lower side suppressing circuit according to the present invention.

Further, as indicated above, the ringing effects produced upon the application of zero-voltage switching in a regular switching power converter includes the ringing in lower side and the ringing in upper side. The principle of and advantage of the invention of suppressing these two ringing effects are outlined hereinafter with reference to the equivalent circuits shown in FIGS. from 11 through 14:

(a) The Principle of Suppressing the Ringing in Lower Side and Its Advantages:

(1) Within Time Segment t7~t8:

Referring to the equivalent circuit shown in FIG. 11(a), this time segment is the direction change stage of the current $i_{La}$ at the auxiliary inductance La. In this time segment, the transformer is short-circuited by the diodes D2 and D1 at the time t7, the current $i_{La}$ at the auxiliary inductance La boosts rapidly. When at the time t7a, the current $i_{La}$ is changed from negative value to positive value. After the time t8, the current $i_{La}$ rises continuously at a relatively smoother slope.

Figure 11B:
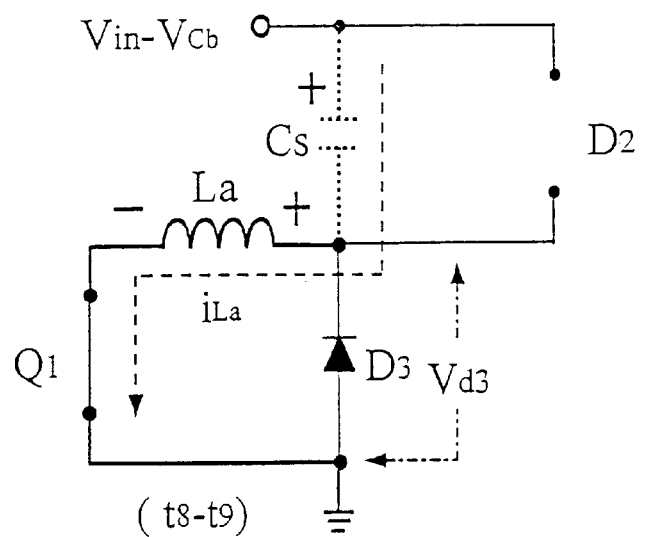
Figure 12:
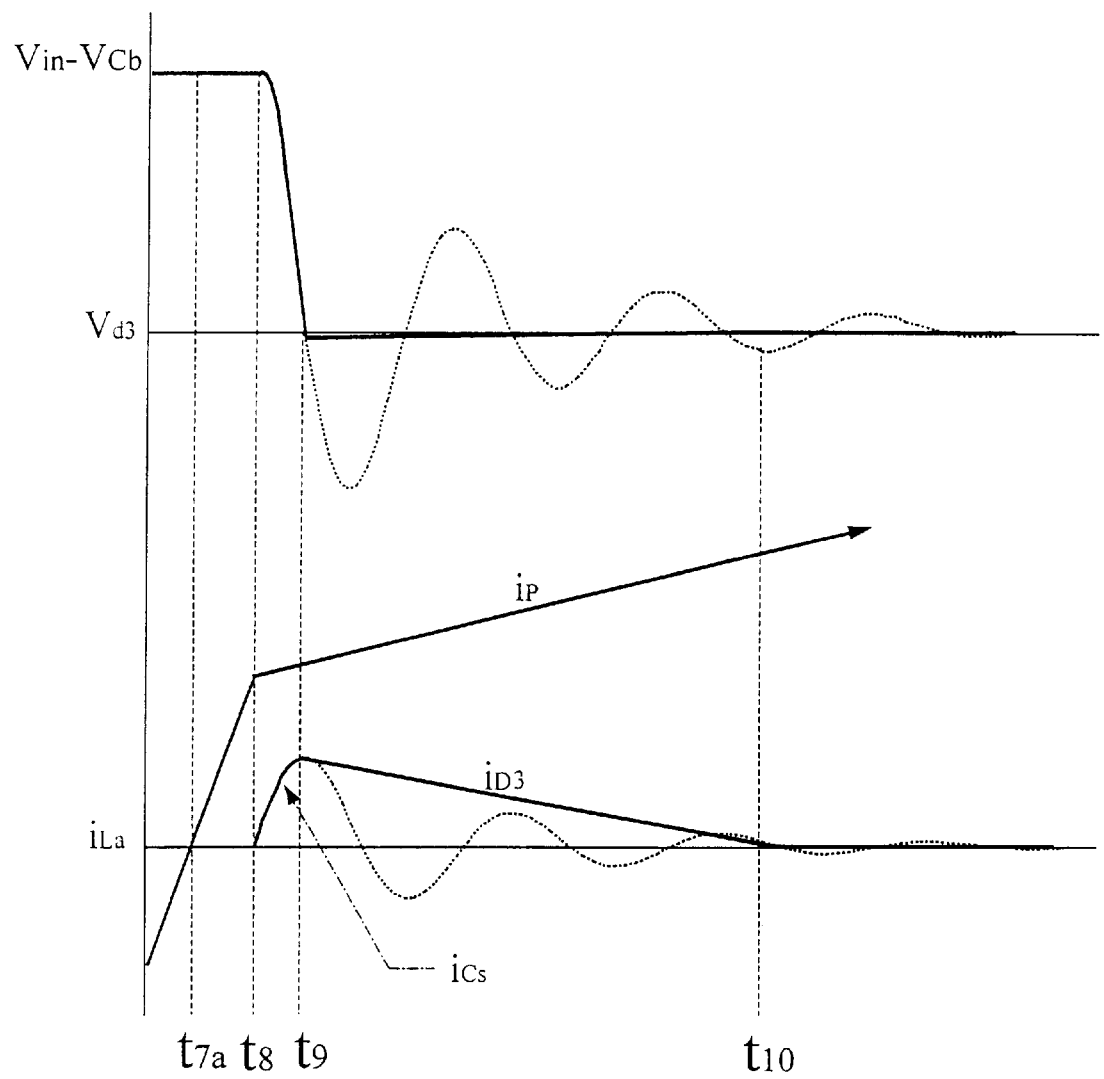
FIG. 12 is a waveform chart showing the voltage and current waveforms of the ringing on lower side suppressing circuit according to the present invention.

(2) Within Time Segment t8~t9:

Referring to the equivalent circuit shown in FIG. 11(b), this time segment is the initial stage of ringing in lower side. Please refer also to FIG. 12, which shows the voltage and current waveforms of the ringing in lower side suppressing circuit. As illustrated, the electric current $i_{La}$ at the auxiliary inductance La is shunted into two parts. The value of the current part $i_p$ passing through the primary side of the transformer has concern with the load only, and does not affect the action of the ringing. The value of the current part $i_{Cs}$ and $i_{D3}$ passing through stray capacitor Cs and the diode D3 of the primary side has nothing to do with the load, but affects the action of the ringing. When at the time t8, the diode D2 is open-circuited, the transformer is free from short-circuit. A L-C tank is formed by the auxiliary inductance La and the stray capacitor Cs at the primary side of the transformer and starts ringing under the initial condition of V(La)=Vin−Vcb, V(Cs)=0. Because the stray capacitor Cs becomes charged, the voltage Vd3 at the diode D3 drops rapidly. When the voltage Vd3 drops to negative value, the diode D3 is electrically connected, and the resonance current at the auxiliary inductance La is immediately short-circuited by the diode D3 and the power MOSFET Q1 to suppress the occurrence of ringing. At the time t9, the energy accumulated in the stray capacitor Cs is equal to that in the auxiliary inductance La as:

$$E(Cs) = E(La) = \frac{1}{2}Cs(Vin - Vcb)^2 \qquad (1)$$

Figure 11C:
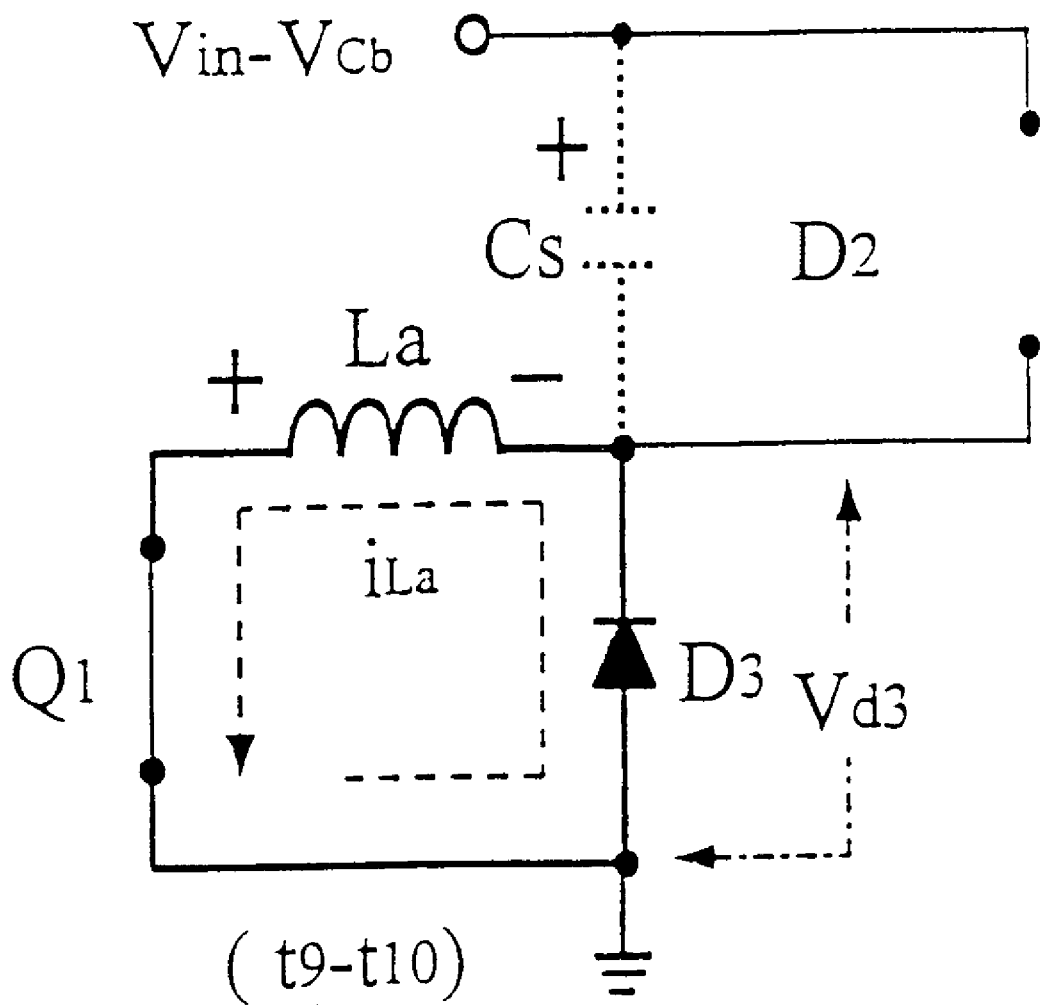

(3) Within Time Segment t9~t10:

Referring to the equivalent circuit shown in FIG. 11(c). In this time segment, ringing in lower side is suppressed. If ringing is not suppressed by the diode D3 and damping ratio is zero, the voltage at the stray capacitor Cs at the primary side of the transformer is charged to the level of two times of Vin−Vcb, causing the stray capacitor Cs to accumulate the maximum energy of which the value is:

$$E(Cs) = \frac{1}{2}Cs[2(Vin - Vcb)]^2 \qquad (2)$$

Further, if ringing is not suppressed by the diode D3 and a RC snubber circuit is added thereto, it gets rid of the effect of ringing only when the RC snubber circuit fully consumes the maximum energy accumulated in the stray capacitor Cs. When ringing in lower side is suppressed by the diode D3, the energy accumulated in the auxiliary inductance at the time t9 will be fully consumed by the diode D3 during the time segment t9~t10. Because ringing in lower side is suppressed, the loss of the circuit will be reduced, and the loss reduced is the result of equation (2) minus equation (1):

$$\text{Loss reduced} = \frac{3}{2}Cs(Vin - Vcb)^2 \quad (3)$$

According to the above analysis, the application of ring free technique to the aforesaid embodiment reduces three fourth of energy loss caused by ringing in lower side.

Figure 13A:
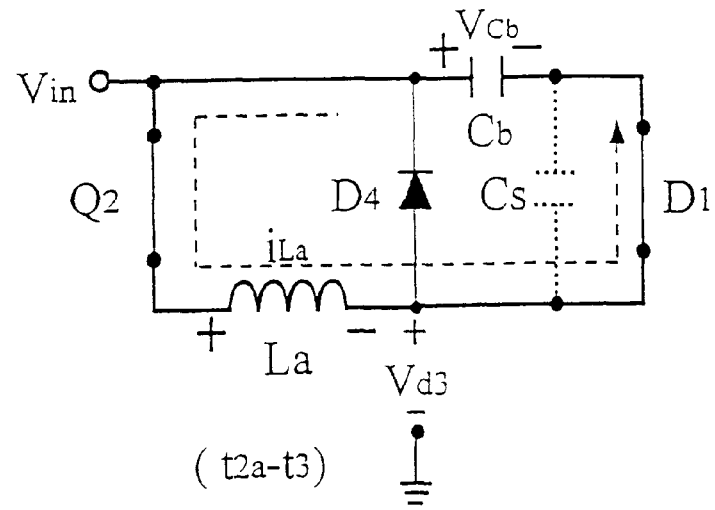
FIGS. 13(a)–13(c) illustrates time segment charts of the ringing on upper side suppressing circuit according to the present invention.

(b) The Principle of Suppressing the Ringing in Upper Side and Its Advantages:

The principle of suppressing the ringing in upper side is same as that of suppressing the ringing in lower side, with the exception of different energy loss, which is detailedly described as follows:

(1) Within Time Segment t2~t3:

Referring to the equivalent circuit shown in FIG. 13(a), this time segment is the direction change stage of the current $i_{La}$ at the auxiliary inductance La. In this time segment, the transformer is short-circuited by the diodes D1 and D2 at the time t2, the current $i_{La}$ at the auxiliary inductance La drops rapidly. When at the time t2a, the current is changed from positive value to negative value. After the time t3, because of open-circuit of the diode D1, the current drops continuously at a relatively smoother slope.

Figure 13B:
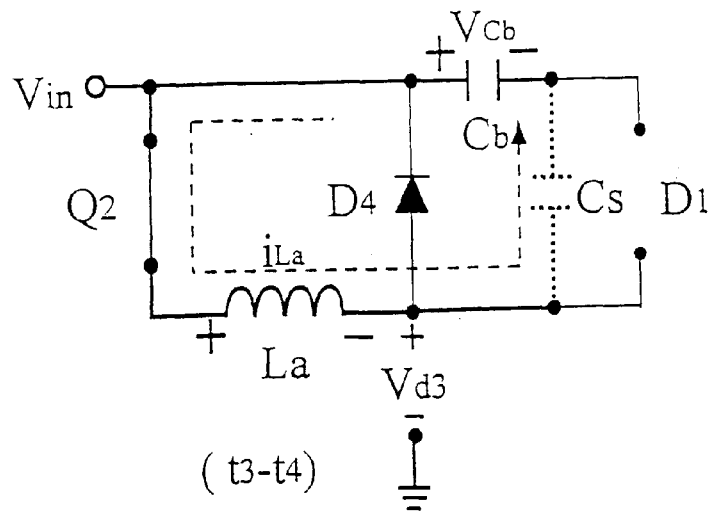
Figure 14:
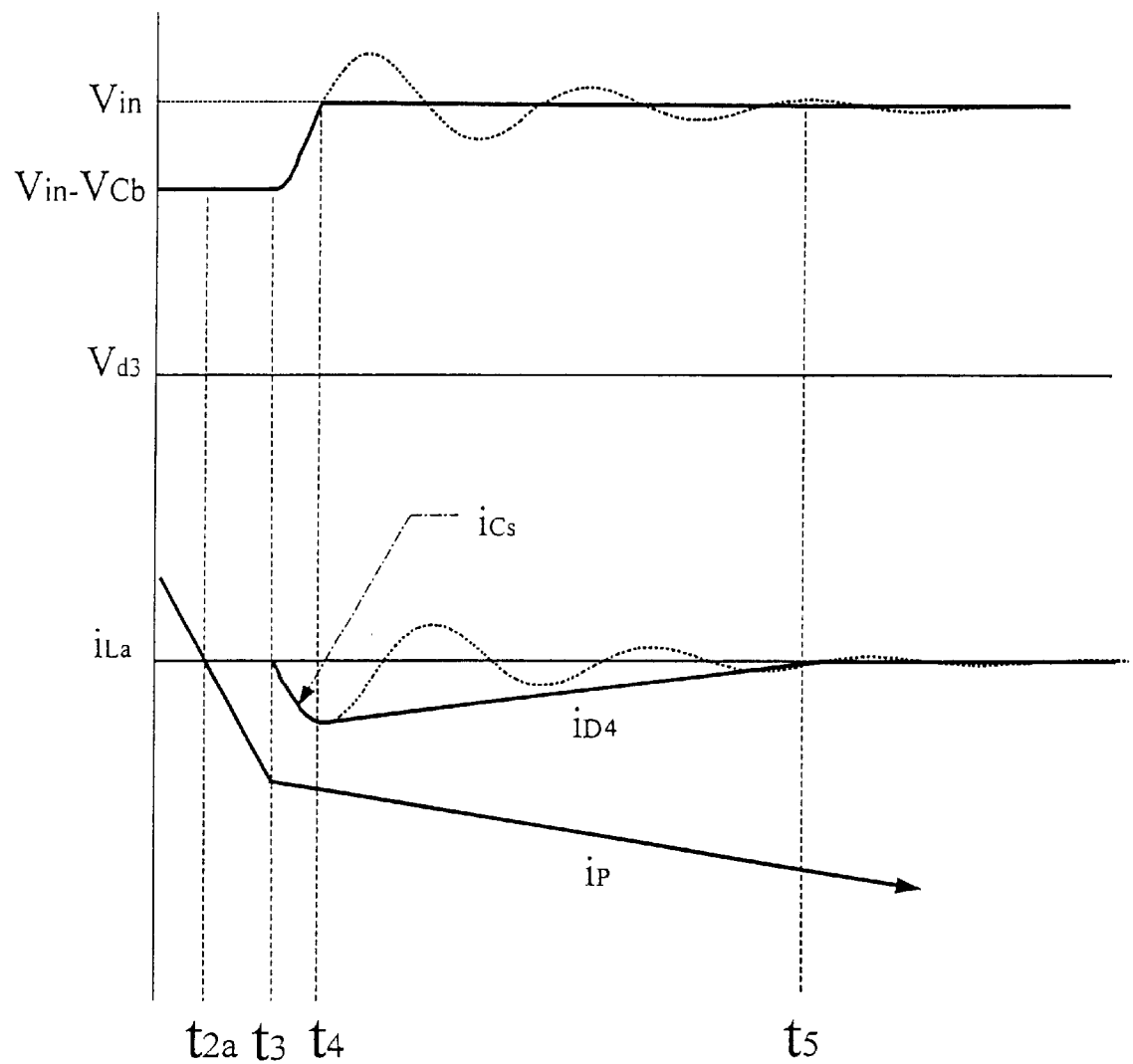
FIG. 14 is a waveform chart showing the voltage and current waveforms of the ringing on upper side suppressing circuit according to the present invention.

(2) Within Time Segment t3~t4:

Referring to the equivalent circuit shown in FIG. 13(b), this time segment is the initial stage of the ringing in upper side. Please refer also to FIG. 14, which shows the voltage and current waveforms of the ringing in upper side suppressing circuit. As illustrated, the electric current $i_{La}$ at the auxiliary inductance La is shunted into two parts. The value of the current part $i_p$ passing through the primary side of the transformer has concern with the load only, and does not affect the action of the ringing. The value of the current part $i_{Cs}$ and $i_{D4}$ has nothing to do with the load, but affects the action of the ringing. When at the time t3, the diode D1 is open-circuited, the transformer is free from short-circuit. A L-C tank is formed by the auxiliary inductance La and the stray capacitor Cs at the primary side of the transformer, and starts ringing under the initial condition of V(La)=Vin, V(Cs)=0. Because the stray capacitor Cs becomes charged, the voltage Vd3 at the diode D3 boosts rapidly. When the voltage Vd3 surpasses the input voltage Vin, the diode D4 is electrically connected, and the resonance current at the auxiliary inductance La is immediately short-circuited by the diode D4 and the power MOSFET Q2 to suppress the occurrence of ringing. At the time t4, the energy accumulated in the stray capacitor Cs is equal to that in the auxiliary inductance La as:

$$E(Cs) = E(La) = \frac{1}{2}CsVcb^2 \quad (4)$$

Figure 13C:
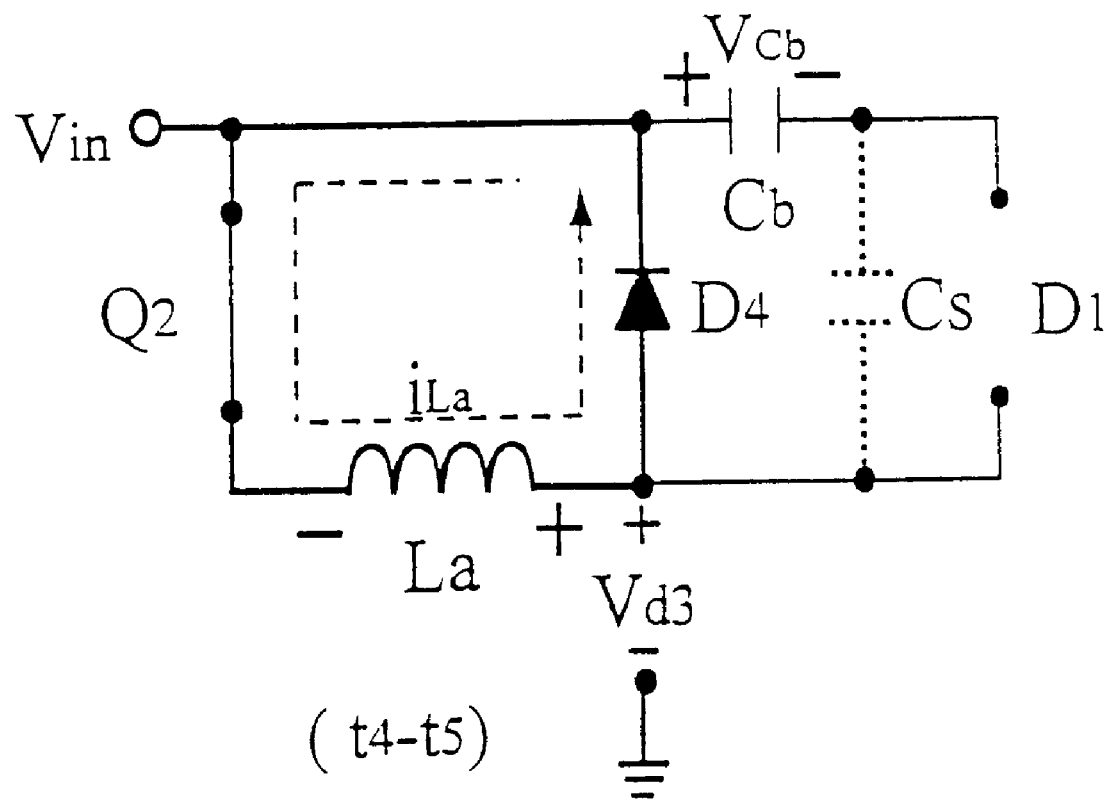

(3) Within Time Segment t4~t5:

Referring to the equivalent circuit shown in FIG. 13(c). In this time segment, ringing in upper side is suppressed. If ringing is not suppressed by the diode D4 wand damping ratio is zero, the voltage at the stray capacitor Cs at the primary side of the transformer will be charged to two times of Vcb, causing the stray capacitor Cs to accumulate the maximum energy of which the value is:

$$E(Cs) = 2CsVcb^2 \quad (5)$$

Further, if ringing is not suppressed by the diode D4 and a RC snubber circuit is added thereto, it gets rid of the effect of ringing only when the RC snubber circuit fully consumes the maximum energy accumulated in the stray capacitor Cs. When ringing in lower side is suppressed by the diode D4, the energy accumulated in the auxiliary inductance La at the time t4 will be fully consumed by the diode D4 during the time segment t4~t5. Because ringing in upper side is suppressed, the loss of the circuit will be reduced, and the loss reduced is the result of equation (5) minus equation (4):

$$\text{Reduced Loss} = \frac{3}{2}CsVcb^2 \quad (6)$$

According to the above analysis, the application of the ring free technique to the aforesaid embodiment reduces by three fourth of energy loss caused by ringing in upper side.

Combining equation (2) and equation (5), the total energy loss resulted from ringing in upper side and ringing in lower side is:

$$\text{Ringing total loss} = 2Cs[(Vin-Vcb)^2 + Vcb^2] \quad (7)$$

Combining equation (1) and equation (4), the total energy loss when ringing in upper side and ringing in lower side are suppressed is:

$$\text{Ring free total loss} = \frac{1}{2}Cs[(Vin - Vcb)^2 + Vcb^2] \quad (8)$$

In the aforesaid embodiment, if the stray capacitor Cs at the primary side of the transformer is 100 pF, input voltage Vin is 400 V, and the voltage Vcb at the capacitor Cb is 100 V, and the ringing of the switching power converter is consumed by using RC snubber circuit, thus the total energy loss is 20 µJ, and the ring free energy loss is 5.0 µJ. Therefore, the energy loss during ringing free is reduced by 15 µJ. At this time, if the power-switching converter works under 100 KHz, the power loss of the RC snubber circuit is 2.0 Watt, and the ring free power loss is 0.5 Watt, thus the power loss during ringing free is reduced by 1.5 Watt. In case the working frequency is increased to 200 KHz, the power loss of the RC snubber circuit is 4.0 Watt, and ring free power loss is 1.0 Watt, therefore ring free power loss is reduced by 3.0 Watt As stated, ring loss is directly proportional to the working frequency. This is the important factor why conventional switching power converter cannot break through the maximum working frequency when designing a zero-voltage switching circuit. After the application of ring free system of the invention, energy loss due to ringing is greatly reduced, and working frequency of zero-voltage switching circuit and power density of switching power converter are improved.

Figure 15:
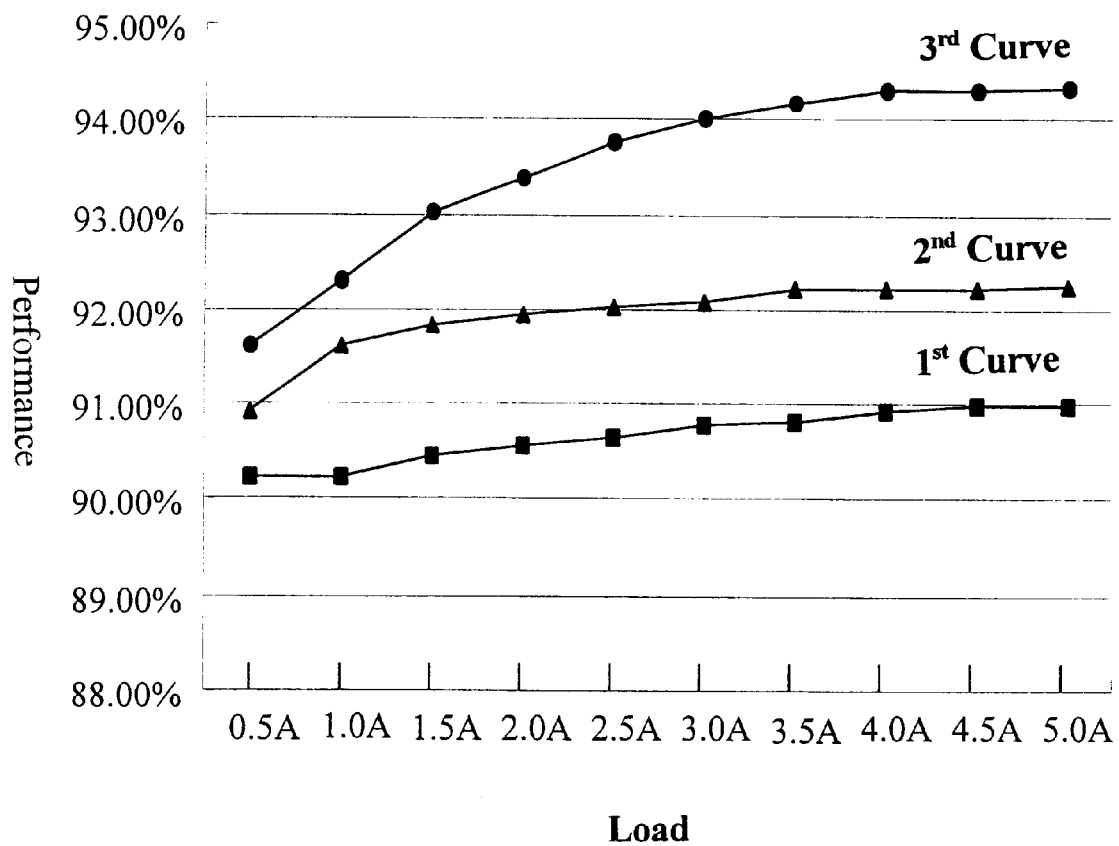
FIG. 15 is a load-performance chart obtained from the circuit shown in FIG. 7.

FIG. 15 is a performance-load curve explaining the achievement in performance of the embodiment shown in FIG. 7. In this embodiment, the input voltage Vin is 370 V DC, the output voltage Vout is 12 V/5A, the working frequency is 60 KHz, the inductance Lp at the primary winding of the main transformer is 1.2 mH, the leakage inductance is 4.5 µH, and added auxiliary inductance La is 35 µH. The first curve is obtained by using a RC snubber circuit to eliminate ringing, which achieves the performance of 91%. The second curve is obtained under the same working conditions as for the first curve, with the exception of the use of the diodes D3 and D4 to suppress ringing.

Because no snubber circuit energy consumption, the performance is improved to 92%. The third curve is obtained under the same working conditions as for the second curve, with the exception of the use of a 100 V Schottky diode of forward voltage drop Vf 0.65 V, which improves the performance up to 94%.

Figure 16A:
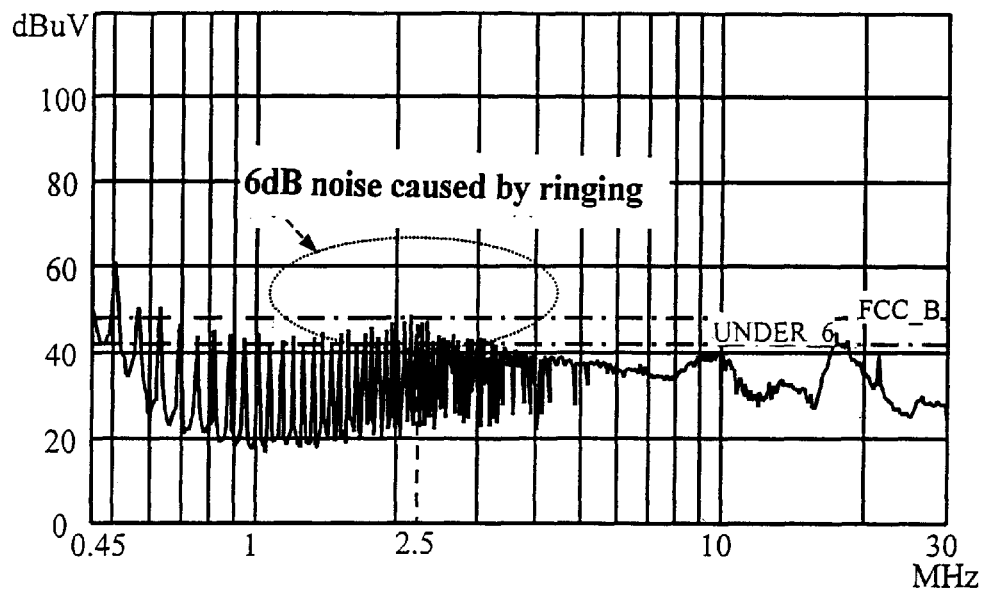
FIGS. 16(a) and 16(b) illustrate the achievement in EMI of the circuit shown in FIG. 7.
Figure 16B:
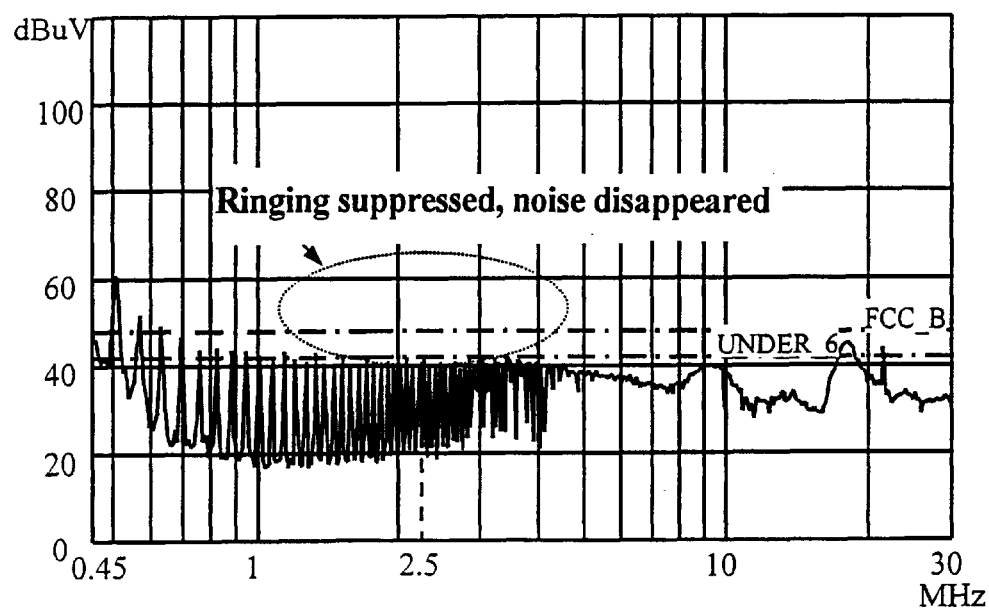

FIGS. 16(a) and 16(b) show the achievement of the embodiment shown in FIG. 7 in EMI noises. FIG. 16(a) illustrates the frequency spectrum obtained under ringing, and FIG. 16(b) illustrate the frequency spectrum obtained without ringing. As indicated, an improvement of about 6 dB is indicated around 2.5 MHz. Actually, 2.5 MHz is about the frequency of ringing. When ringing is suppressed, the related noises are disappeared from the frequency spectrum.

Figure 17:
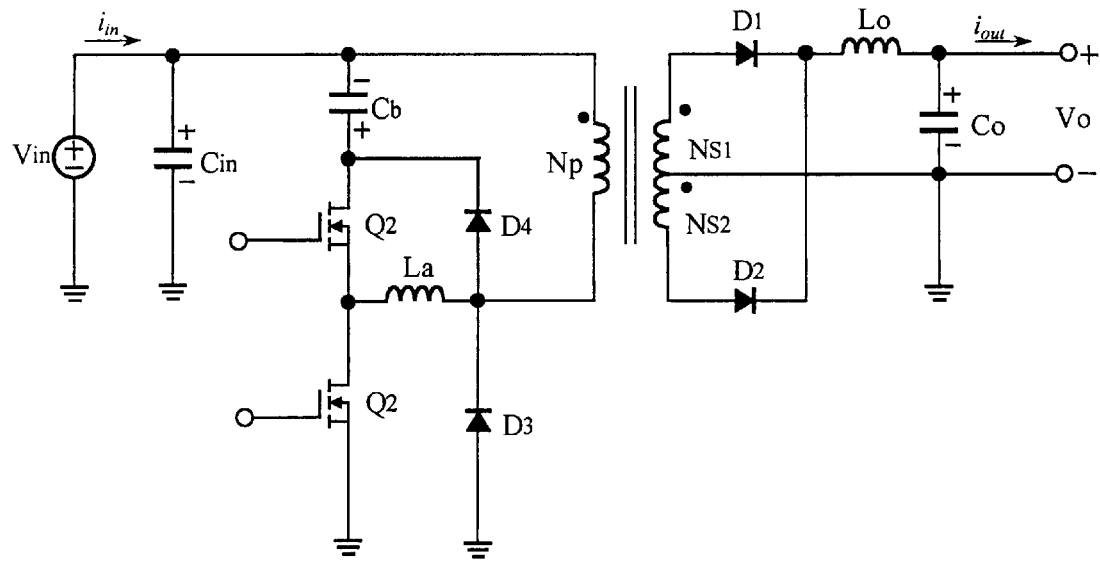
FIG. 17 is a circuit diagram of the second embodiment of the present invention.

In the second embodiment of the present invention, the ring-free zero-voltage switching technique is applied to the design of a half-bridge boost-forward zero-voltage switching full-wave converter. This embodiment, as shown in FIG. 17 can be called as half-bridge boost-forward ring-free zero-voltage-switching full-wave converter. This embodiment comprises an input voltage filter capacitor Cin and a series circuit formed of power MOSFETs Q1;Q2 and a capacitor Cb connected in parallel to the input voltage filter capacitor Cin. The positive and negative poles of the input voltage filter capacitor Cin are bridged to the positive and negative poles of an input voltage Vin. The capacitor Cb has its negative pole connected to the positive pole of the capacitor Cin, and its positive pole connected to the drain of the power MOSFET Q2. The source of the power MOSFET Q2 is connected to the drain of the power MOSFET Q1. The source of the power MOSFET Q1 is connected to the negative pole of the capacitor Cin, Therefore, the input voltage filter capacitor Cin provides a stable input voltage to the transformer. The transformer comprises a primary winding Np and two secondary windings Ns1;Ns2 (see FIG. 17). The primary winding Np has one end connected to the negative pole of the capacitor Cb, and the other end connected to the circuit between the power MOSFETs Q1;Q2 through an auxiliary inductance La. According to this embodiment, the circuit between the primary winding Np and the auxiliary inductance La is respectively connected to the drain of the power MOSFET Q2 and the source of the power MOSFET Q1 through diodes D4 and D3 respectively, so that the diode D4 (or D3) works with the power MOSFET Q2 (or Q1) to let the electric current $i_{La}$ of the auxiliary inductance La be short-circuited by the power MOSFET Q2 and the diode D4 (or by the power MOSFET Q1 and the diode D3) to terminate the ringing upon its formation. The circuit connection of the secondary windings Ns1;Ns2 is same as the circuit at the secondary side of the aforesaid first embodiment.

Figure 18:
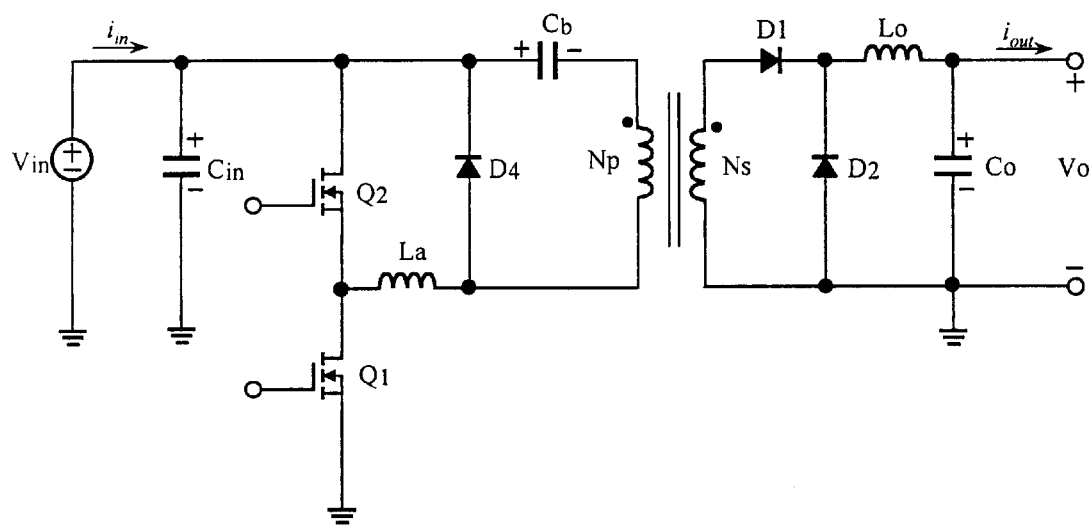
FIG. 18 is a circuit diagram of the third embodiment of the present invention.

In the third embodiment of the present invention, the ring-free zero-voltage switching technique is applied to the design of a half-bridge forward zero-voltage-switching half-wave converter. This embodiment, as shown in FIG. 18 can be called as half-bridge forward ring-free zero-voltage-switching half-wave converter. This embodiment comprises an input voltage filter capacitor Cin and a series of power MOSFETs Q1;Q2 connected in parallel to the input voltage filter capacitor Cin. The positive and negative poles of the input voltage filter capacitor Cin are bridged to the positive and negative poles of an input voltage Vin. The power MOSFET Q2 has its drain connected to the positive pole of the capacitor Cin and the negative pole of a capacitor Cb, and its source connected to the drain of the power MOSFET Q1. The source of the power MOSFET Q1 is connected to the negative pole of the capacitor Cin. Therefore, the input voltage filter capacitor Cin provides a stable input voltage to the transformer. The transformer comprises a primary winding Np and a secondary winding Ns (see FIG. 18). The primary winding Np has one end connected to the negative pole of the capacitor Cb, and the other end connected to the circuit between the power MOSFETs Q1;Q2 through an auxiliary inductance La. The positive pole of the capacitor Cb is connected to the drain of the power MOSFET Q2. According to this embodiment, the circuit between the primary winding Np and the auxiliary inductance La is connected to the drain of the power MOSFET Q2 through a diode D4, so that the diode D4 works with the power MOSFET Q2 to let the electric current $i_{La}$ of the auxiliary inductance La be short-circuited by the power MOSFET Q2 and the diode D4 to terminate the ringing upon its formation. The secondary winding Ns has one end connected in proper order to the positive pole of a diode D2 and the negative pole of an output voltage filter capacitor Co, and the other end connected in proper order through a diode D1 and an inductor Lo to the positive pole of the capacitor Co. The negative pole of the diode D2 is connected to the circuit between the diode D1 and the inductor Lo. Because this embodiment adopts half-wave rectification, the ringing effect occurs only when the diode D1 is stopped. Therefore, adding the diode D4 is sufficient to achieve ring-free switching.

Figure 19:
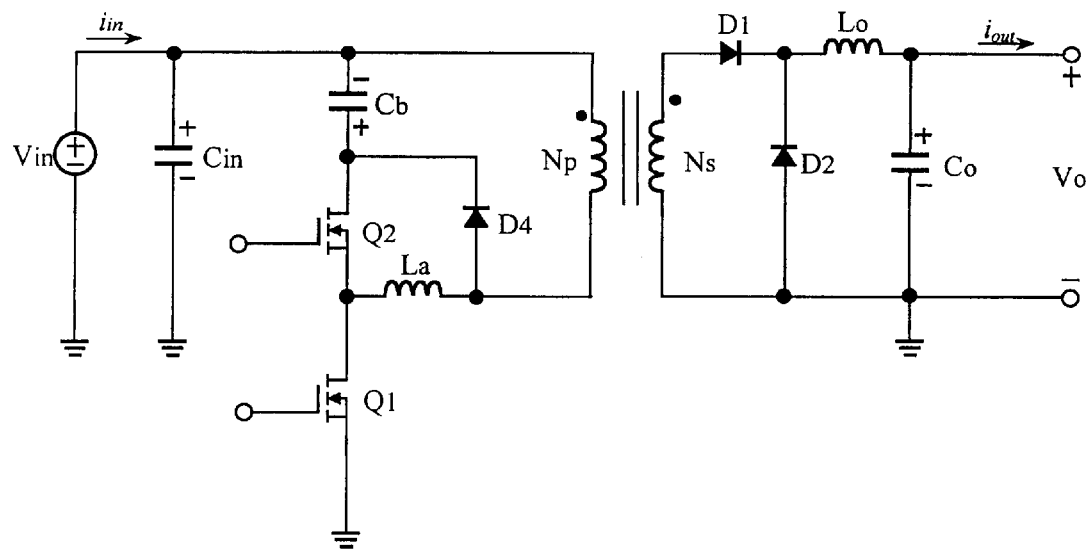
FIG. 19 is a circuit diagram of the fourth embodiment of the present invention.

In the fourth embodiment of the present invention, the ring-free zero-voltage switching technique is applied to the design of a half-bridge boost-forward zero-voltage-switching half-wave converter. This embodiment, as shown in FIG. 19, can be called as half-bridge boost-forward ring-free zero-voltage-switching half-wave converter. This embodiment comprises an input voltage filter capacitor Cin, and a series circuit formed of power MOSFETs Q1;Q2 and a capacitor Cb connected in parallel to the input voltage filter capacitor Cin. The capacitor Cb has its negative pole connected to the positive pole of the capacitor Cin, and its positive pole connected to the drain of the power MOSFET Q2. The source of the power MOSFET Q2 is connected to the drain of the power MOSFET Q1. The source of the power MOSFET Q1 is connected to the negative pole of the capacitor Cin. Therefore the input voltage filter capacitor Cin provides a stable input voltage to the transformer. The transformer comprises a primary winding Np and a secondary winding Ns (see FIG. 19). The primary winding Np has one end connected to the negative pole of the capacitor Cb, and the other end connected to the circuit between the power MOSFETs Q1;Q2 through an auxiliary inductance La. According to this embodiment, the circuit between the primary winding Np and the auxiliary inductance La is connected to the drain of the power MOSFET Q2 through a diode D4, so that the diode D4 works with the power MOSFET Q2 to let the electric current $i_{La}$ of the auxiliary inductance La be short-circuited by the power MOSFET Q2 and the diode D4 to terminate the ringing upon its formation. The circuit connection of the secondary winding Ns is same as the circuit at the secondary side of the aforesaid third embodiment. Because this embodiment adopts half-wave rectification, the ringing effect occurs only when the diode D1 is stopped. Therefore, adding the diode D4 is sufficient to achieve ring-free switching.

Figure 20:
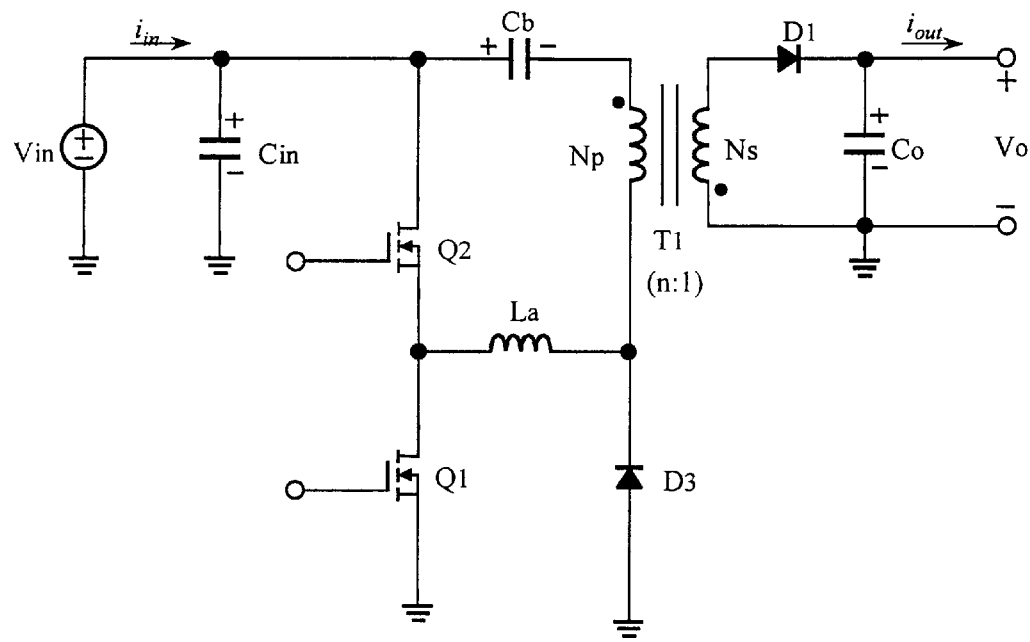
FIG. 20 is a circuit diagram of the fifth embodiment of the present invention.

In the fifth embodiment of the present invention, the ring-free zero-voltage switching technique is applied to the design of a half-bridge flyback zero-voltage-switching converter. This embodiment, as shown in FIG. 20, can be called as half-bridge flyback ring-free zero-voltage-switching converter. This embodiment comprises an input voltage filter capacitor Cin, and a series circuit formed of power MOSFETs Q1;Q2 connected in parallel to the input voltage filter capacitor Cin. The power MOSFET Q2 has its drain connected to the positive pole of the capacitor Cin and the negative pole of a capacitor Cb, and its source connected to the drain of the power MOSFET Q1. The source of the power MOSFET Q1 is connected to the negative pole of the capacitor Cin, enabling the input voltage filter capacitor Cin to provide a stable input voltage to a transformer T1. The transformer T1 comprises a primary winding Np and a secondary winding Ns (see FIG. 20). The primary winding Np has one end connected to the negative pole of the capacitor Cb, and the other end connected to the circuit between the power MOSFETs Q1;Q2 and the source of the power MOSFET Q1 through an auxiliary inductance La and a diode D3 respectively According to this embodiment, the circuit between the primary winding Np and the auxiliary inductance La is connected to the source of the power MOSFET Q1 through a diode D3, so that the diode D3 works with the power MOSFET Q1 to let the electric current $i_{La}$ of the auxiliary inductance La be short-circuited by the power MOSFET Q1 and the diode D3 to terminate the ringing upon its formation. The secondary winding Ns has one end connected to the positive pole of the output voltage filter capacitor Co through a diode D1, and the other end connected to the negative pole of the capacitor Co, enabling the capacitor Co to provide a stable DC output voltage Vo to the load at the output end. Because this embodiment adopts half-wave rectification, the ringing effect occurs only when the diode D1 is stopped. Therefore, adding the diode D3 is sufficient to achieve ring-free switching.

Figure 21:
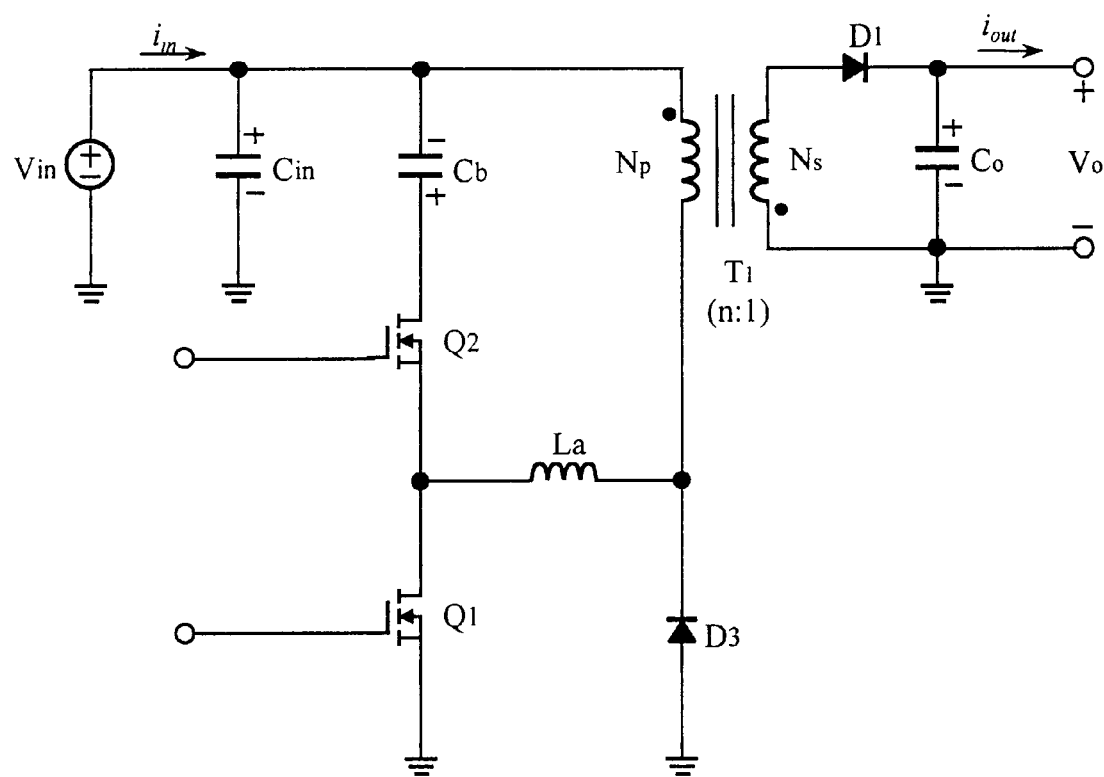
FIG. 21 is a circuit diagram of the sixth embodiment of the present invention.

In the sixth embodiment of the present invention, the ring-free zero-voltage switching technique is applied to the design of a half-bridge boost-flyback zero-voltage-switching converter. This embodiment, as shown in FIG. 21, can be called as half-bridge boost-flyback ring-free zero-voltage-switching converter. This embodiment comprises an input voltage filter capacitor Cin, and a series circuit formed of power MOSFETs Q1;Q2 and a capacitor Cb connected in parallel to the input voltage filter capacitor Cin. The capacitor Cb has its negative pole connected to the positive pole of the capacitor Cin, and its positive pole connected to the drain of the power MOSFET Q2. The source of the power MOSFET Q2 is connected to the drain of the power MOSFET Q1. The source of the power MOSFET Q1 is connected to the negative pole of the capacitor Cin. Therefore the input voltage filter capacitor Cin provides a stable input voltage to a transformer T1. The transformer T1 comprises a primary winding Np and a secondary winding Ns (see FIG. 21). The primary winding Np has one end connected to the negative pole of the capacitor Cb, and the other end connected to the circuit between the power MOSFETs Q1;Q2 and the source of the power MOSFET Q1 through an auxiliary inductance La and a diode D3 respectively. According to this embodiment, the circuit between the primary winding Np and the auxiliary inductance La is connected to the source of the power MOSFET Q1 through a diode D3, so that the diode D3 works with the power MOSFET Q1 to let the electric current $i_{La}$ of the auxiliary inductance La be short-circuited by the power MOSFET Q1 and the diode D3 to terminate the ringing upon its formation. The circuit connection of the secondary winding Ns is same as the circuit at the secondary side of the aforesaid fifth embodiment. Because this embodiment adopts half-wave rectification, the ringing effect occurs only when the diode D1 is stopped. Therefore, adding the diode D3 is sufficient to achieve ring-free switching.

As indicated above, the zero-voltage switching technique of the present invention enables the switching power converters to achieve zero-voltage switching under high-frequency environment, preventing abnormal heating of the auxiliary inductance due to parasitic oscillation, so as to effectively reduce power loss and reverse voltage rating requirement to the rectifier component parts at the secondary side, to greatly increase the working frequency and power density, to eliminate EMI noises, to minimize the size of the heat sink required for dissipating heat energy from the power MOSFETS, and to let the switching power converters meet the requirements of international EMI regulations and be applicable to the designs of mini electronic products.

A prototype of ring-free zero-voltage switching technique has been constructed with the features of FIGS. from 7 through 21. The ring-free zero-voltage switching technique functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A ring-free zero-voltage switching technique for use in a switching power converter having a zero-voltage switching circuit to achieve high-performance and high-density zero-voltage switching and a transformer to produce an oscillatory L-C circuit at the primary side thereof during zero-voltage switching of the switching power converter, the technique comprises the step of short-circuiting the current at inductance means of said L-C circuit upon the occurrence of ringing, and to suppress the voltage at capacitor means of said L-C circuit, so as to eliminate parasitic ringing produced by the zero-voltage switching circuit.

2. The ring-free zero-voltage switching technique of claim 1 wherein the capacitor means of said L-C circuit is a stray capacitor at the primary side of said transformer.

3. The ring-free zero-voltage switching technique of claim 1 wherein said inductance means of said L-C circuit is an auxiliary inductance connected to the connecting point between a primary winding of said transformer and two power switches being connected in series to the primary winding of said transformer.

4. The ring-free zero-voltage switching technique of claim 3 wherein said power switches are power MOSFETs.

5. The ring-free zero-voltage switching technique of claim 4 wherein at least one shorted diode is connected to the connection between the primary winding of said transformer and said auxiliary inductance and adapted to work with said power MOSFETs to short-circuit the current at said auxiliary inductance and to suppress the voltage at said stray capacitor, preventing said auxiliary inductance and stray capacitor to oscillate.

6. A half-bridge forward ring-free zero-voltage-switching full-wave converter comprising:

an input voltage filter capacitor, said input voltage filter capacitor having a positive pole and a negative pole respectively bridged to positive and negative poles of an input voltage, and a series circuit of a first power switch and a second power switch connected thereto in parallel, said second power switch having the drain connected to the positive pole of said input voltage filter capacitor and the source connected to the drain of said first power switch, said first power switch having the source connected to the negative pole of said input voltage filter capacitor; and a transformer, said transformer comprising a primary winding at one side, and two secondary windings at an opposite side, said primary winding having one end connected to the negative pole of a primary side capacitor and an opposite end connected to the circuit between said first power switch and said second power switch through an auxiliary inductance, said primary side capacitor having a positive pole connected to the drain of said second power switch, the circuit between said primary winding and said auxiliary inductance being respectively connected to the drain of said second power switch and the source of said first power switch through two diodes respectively, so that said diodes work with said power switches respectively to let the electric current of said auxiliary inductance be short-circuited by said respective power switch and diode to terminate the ringing upon the formation of the ringing.

7. The half-bridge forward ring-free zero-voltage-switching full-wave converter of claim 6 wherein said secondary windings each have one end connected to the negative pole of an output voltage filter capacitor and an opposite end respectively connected to the positive pole of two diodes, said diodes having the negative pole respectively connected to the positive pole of said output voltage filter capacitor through an inductance, so that said output voltage filter capacitor provides a stable DC output voltage to the load at the output end.

8. The half-bridge forward ring-free zero-voltage-switching full-wave converter of claim 7 wherein said power switches are power MOSFETs.

9. A half-bridge boost-forward ring-free zero-voltage-switching full-wave converter comprising:
   an input voltage filter capacitor, said input voltage filter capacitor having a positive pole and a negative pole respectively bridged to positive and negative poles of an input voltage, and a series circuit of a first power switch, a second power switch and a primary side capacitor connected in parallel to said input voltage filter capacitor, said primary side capacitor having the negative pole connected to the positive pole of said input voltage filter capacitor and the positive pole connected to the drain of said second power switch, said second power switch having the source connected to the drain of said first power switch, said first power switch having the source connected to the negative pole of said input voltage filter capacitor; and
   a transformer, said transformer comprising a primary winding and two secondary windings, said primary winding having one end connected to the negative pole of said primary side capacitor and an opposite end connected to the circuit between said first power switch and said second power switch through an auxiliary inductance, the circuit between said primary winding and said auxiliary inductance being respectively connected to the drain of said second power switch and the source of said first power switch through two diodes respectively, so that said diodes work with said power switches respectively to let the electric current of said auxiliary inductance be short-circuited by said respective power switch and diode to terminate the ringing upon the formation of the ringing.

10. The half-bridge boost-forward ring-free zero-voltage-switching full-wave converter of claim 9 wherein said secondary windings each have one end connected to the negative pole of an output voltage filter capacitor and an opposite end respectively connected to the positive pole of two diodes, said diodes having the negative pole respectively connected to the positive pole of said output voltage filter capacitor through an inductance, so that said output voltage filter capacitor provides a stable DC output voltage to the load at the output end.

11. The half-bridge boost-forward ring-free zero-voltage-switching full-wave converter of claim 10 wherein said power switches are power MOSFETs.

12. A half-bridge forward ring-free zero-voltage-switching half-wave converter comprising:
   an input voltage filter capacitor, said input voltage filter capacitor having a positive pole and a negative pole respectively bridged to positive and negative poles of an input voltage, and a series circuit of a first power switch and a second power switch connected in parallel to said input voltage filter capacitor, said second power switch having the source connected to the positive pole of said capacitor and the source connected to the drain of said first power switch, said first power switch having the source connected to the negative pole of said input voltage filter capacitor; and
   a transformer, said transformer comprising a primary winding and a secondary winding, said primary winding having one end connected to the negative pole of a primary side capacitor and an opposite end connected to the circuit between said first power switch and said second power switch through an auxiliary inductance, said second power switch having the drain connected to the positive pole of said primary side capacitor, the circuit between said primary winding and said auxiliary inductance being connected to the drain of said second power switch through a diode so that said diode works with said second power switch to let the electric current of said auxiliary inductance be short-circuited by said second power switch and said diode to terminate the ringing upon the formation of the ringing.

13. The half-bridge forward ring-free zero-voltage-switching half-wave converter of claim 12 wherein said secondary winding has one end connected in proper order to the positive pole of a first diode at the secondary side of said transformer and the negative pole of an output voltage filter capacitor and an opposite end connected in proper order through a second diode at the secondary side of said transformer and an inductor to the positive pole of said output voltage filter capacitor, the first diode at the secondary side of said transformer having the negative pole connected to the circuit between the second diode at the secondary side of said transformer and said output voltage filter capacitor.

14. The half-bridge forward ring-free zero-voltage-switching half-wave converter of claim 13 wherein said first power switch and said second power switch are power MOSFETs.

15. A half-bridge boost-forward ring-free zero-voltage-switching half-wave converter, Comprising:
   an input voltage filter capacitor, said input voltage filter capacitor having a positive pole and a negative pole respectively bridged to positive and negative poles of an input voltage, and a series circuit of a first power switch, a second power switch and a primary side capacitor connected in parallel to said input voltage filter capacitor, said primary side capacitor having the negative pole connected to the positive pole of said input voltage filter capacitor and the positive pole connected to the drain of said second power switch, said second power switch having the source connected to the drain of said first power switch, said first power switch having the source connected to the negative pole of said input voltage filter capacitor; and a transformer, said transformer comprising a primary winding and a secondary winding, said primary winding having one end connected to the negative pole of said primary side capacitor and opposite end connected to the circuit between said first power switch and said second power switch through an auxiliary inductance, the circuit between said primary winding and said auxiliary inductance being connected to the drain of said second power switch through a diode, so that said diode works with said second power switch to let the electric current of said auxiliary inductance be short-circuited by said second power switch and said diode to terminate the ringing upon the formation of the ringing.

16. The half-bridge boost-forward ring-free zero-voltage-switching half-wave converter of claim 15 wherein said secondary winding has one end connected in proper order to the positive pole of a first diode at the secondary side of said transformer and the negative pole of an output voltage filter capacitor and an opposite end connected in proper order through a second diode at the secondary side of said transformer and an inductor to the positive pole of said output voltage filter capacitor, the first diode at the secondary side of said transformer having the negative pole connected to the circuit between the second diode at the secondary side of said transformer and said output voltage filter capacitor.

17. The half-bridge boost-forward ring-free zero-voltage-switching half-wave converter of claim 16 wherein said first power switch and said second power switch are power MOSFETs.

18. A half-bridge flyback ring-free zero-voltage-switching converter comprising:

an input voltage filter capacitor, said input voltage filter capacitor having a positive pole and a negative pole respectively bridged to positive and negative poles of an input voltage, and a series circuit of a first power switch and a second power switch connected in parallel to said input voltage filter capacitor, said second power switch having the drain connected to the positive pole of said input voltage filter capacitor and the source connected to the drain of said first power switch, said first power switch having the source connected to the negative pole of said input voltage filter capacitor; and a transformer, said transformer comprising a primary winding and a secondary winding, said primary winding having one end connected to the negative pole of a primary side capacitor and an opposite end connected to the circuit between said first power switch and said second power switch through an auxiliary inductance, the circuit between said primary winding and said auxiliary inductance being connected to the source of said first power switch through a diode, so that said diode works with said first power switch to let the electric current of said auxiliary inductance be short-circuited by said first power switch and said diode to terminate the ringing upon the formation of the ringing.

19. The half-bridge flyback ring-free zero-voltage-switching converter of claim 18 wherein said secondary winding has one end connected to the positive pole of an output voltage filter capacitor through a diode at the secondary side of said transformer and an opposite end connected to the negative pole of the output voltage filter capacitor, enabling said output voltage filter capacitor to provide a stable DC output voltage to the load at the output end.

20. The half-bridge flyback ring-free zero-voltage-switching converter of claim 19 wherein said first power switch and said power switch are power MOSFETs.

21. A half-bridge boost-flyback ring-free zero-voltage-switching converter comprising:

an input voltage filter capacitor, said input voltage filter capacitor having a positive pole and a negative pole respectively bridged to positive and negative poles of an input voltage, and a series circuit of a first power switch, a second power switch and a primary side capacitor connected in parallel to said input voltage filter capacitor, said primary side capacitor having the negative pole connected to the positive pole of said input voltage filter capacitor and the positive pole connected to the drain of said second power switch, said second power switch having the source connected to the drain of said first power switch, said first power switch having the source connected to the negative pole of said input voltage filter capacitor; and a transformer, said transformer comprising a primary winding and a secondary winding, said primary winding having one end connected to the negative pole of the primary side capacitor and an opposite end connected to the circuit between said first power switch and said second power switch through an auxiliary inductance, the circuit between said primary winding and said auxiliary inductance being connected to the source of said first power switch through a diode so that said diode works with said first power switch to let the electric current of said auxiliary inductance be short-circuited by said first power switch and said diode to terminate the ringing upon the formation of the ringing.

22. The half-bridge boost-flyback ring-free zero-voltage-switching converter of claim 21 wherein said secondary winding has one end connected to the positive pole of an output voltage filter capacitor through a diode at the secondary side of said transformer and an opposite end connected to the negative pole of said output voltage filter capacitor, enabling said output voltage filter capacitor to provide a stable DC output voltage to the load at the output end.

23. The half-bridge boost-flyback ring-free zero-voltage-switching converter of claim 22 wherein said first power switch and said power switch are power MOSFETs.

* * * * *